(12) United States Patent
Ortiz et al.

(10) Patent No.: US 12,423,694 B2
(45) Date of Patent: Sep. 23, 2025

(54) PROTOCOL AND GATEWAY FOR COMMUNICATING SECURE TRANSACTION DATA

(71) Applicant: ROYAL BANK OF CANADA, Toronto (CA)

(72) Inventors: Edison U. Ortiz, Orlando, FL (US); Arnold Badal-Badalian, Toronto (CA); Ming Li Liu, Toronto (CA); Ravi Khandavilli, Orlando, FL (US)

(73) Assignee: Royal Bank of Canada, Toronto (CA)

( * ) Notice: Subject to any disclaimer, the term of this patent is extended or adjusted under 35 U.S.C. 154(b) by 517 days.

(21) Appl. No.: 17/702,523

(22) Filed: Mar. 23, 2022

(65) Prior Publication Data

US 2022/0309502 A1    Sep. 29, 2022

Related U.S. Application Data

(60) Provisional application No. 63/165,116, filed on Mar. 23, 2021.

(51) Int. Cl.
*G06Q 20/40* (2012.01)
*G06Q 20/38* (2012.01)

(52) U.S. Cl.
CPC ..... *G06Q 20/401* (2013.01); *G06Q 20/38215* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,892,900 A | * | 4/1999 | Ginter | G06Q 20/02 |
| | | | | 726/26 |
| 10,440,014 B1 | * | 10/2019 | Hoyer | G06Q 20/38215 |
| 10,915,902 B2 | * | 2/2021 | Bouda | G06Q 20/4012 |
| 11,210,650 B2 | * | 12/2021 | Chen | G06Q 20/24 |
| 2013/0254053 A1 | * | 9/2013 | Hayhow | G06Q 20/3829 |
| | | | | 705/44 |

(Continued)

FOREIGN PATENT DOCUMENTS

| | | | | |
|---|---|---|---|---|
| WO | WO-2013126996 A1 | * | 9/2013 | G06Q 20/32 |
| WO | 2015023999 A1 | | 2/2015 | |

(Continued)

OTHER PUBLICATIONS

"Correspond." Vocabulary.com Dictionary, Vocabulary.com, https://www.vocabulary.com/dictionary/correspond. Accessed Aug. 14, 2024. (Year: 2024).*

(Continued)

*Primary Examiner* — Eduardo Castilho
(74) *Attorney, Agent, or Firm* — Norton Rose Fulbright Canada LLP; Brian Chau

(57) ABSTRACT

Systems and methods for secure communication of data packets are described using a communications gateway and protocol. One or more payment generator devices utilize trusted execution environments to store identity attestation parameters which are then utilized during registration and/or validation of device identity at the gateway for secure transmission of secure data, including, for example, payment data.

20 Claims, 28 Drawing Sheets

(56) References Cited

U.S. PATENT DOCUMENTS

| | | | |
|---|---|---|---|
| 2014/0279477 A1* | 9/2014 | Sheets | G06Q 20/3278 |
| | | | 705/41 |
| 2014/0298027 A1 | 10/2014 | Roberts et al. | |
| 2015/0046339 A1* | 2/2015 | Wong | G06Q 20/4016 |
| | | | 705/44 |
| 2017/0359358 A1 | 12/2017 | Alattar et al. | |
| 2021/0126801 A1* | 4/2021 | Nix | G06Q 20/3825 |

FOREIGN PATENT DOCUMENTS

| | | | | |
|---|---|---|---|---|
| WO | 2018006060 A1 | 1/2018 | | |
| WO | 2018063812 A1 | 4/2018 | | |
| WO | 2018145195 A1 | 8/2018 | | |
| WO | 2019190809 A1 | 10/2019 | | |
| WO | WO-2022175399 A1 * | 8/2022 | | G06F 21/6245 |
| WO | WO-2022223262 A1 * | 10/2022 | | H04L 63/045 |

OTHER PUBLICATIONS

Translation of foreign reference WO 2022175399 A1, 2022 (Year: 2022).*

Translation of foreign reference WO 2022223262 A1 (Year: 2022).*

Q. Zhang, K. Mayes and K. Markantonakis, "A user-centric m-payment solution," 2005 2nd Asia Pacific Conference on Mobile Technology, Applications and Systems, Guangzhou, China, 2005, pp. 8 pp. 8, doi: 10.1109/MTAS.2005.207134. (Year: 2005).*

M. Ashraff, M. L. Kabir, S. M. Aziz and B. k. Dey, "A Conceptual Framework for a SIM-based Electronic Transaction Authentication System," 2007 IFIP International Conference on Network and Parallel Computing Workshops (NPC 2007), Dalian, China, 2007, pp. 65-71, doi: 10.1109/NPC.2007.154. (Year: 2007).*

Z. Saquib, M. Kumar, K. K. Kamal and B. Varyani, "Secure solution: One time mobile originated PKI," 2017 Annual IEEE International Systems Conference (SysCon), Montreal, QC, Canada, 2017, pp. 1-6, doi: 10.1109/SysCon.2017.7934752. (Year: 2017).*

S. Gupta and R. Johari, "A New Framework for Credit Card Transactions Involving Mutual Authentication between Cardholder and Merchant" 2011 International Conference on Communication Systems and Network Technologies, Katra, India, 2011, pp. 22-26, doi: 10.1109/CSNT.2011.12. (Year: 2011).*

M. Song, J. Li and X. Wu, "A Mutual Authentication Model between Merchant and Consumer in M-Commerce," Second International Conference on Innovative Computing, Informatio and Control (ICICIC 2007), Kumamoto, Japan, 2007, pp. 489-489, doi: 10.1109/ICICIC.2007.42. (Year: 2007).*

Canadian Intellectual Property Office (CIPO), International Search Report and Written Opinion to PCT/CA2022/050438, Jun. 27, 2022.

* cited by examiner

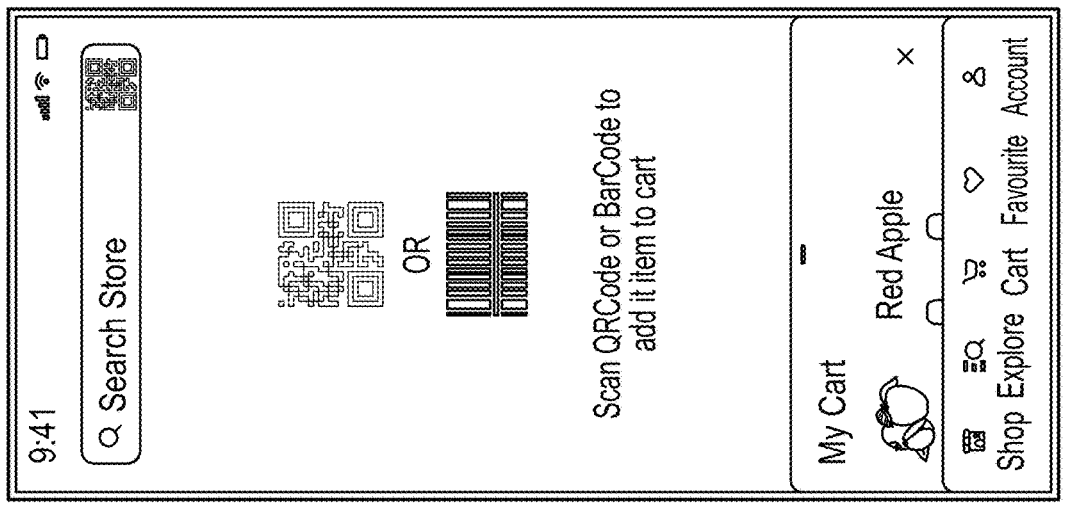
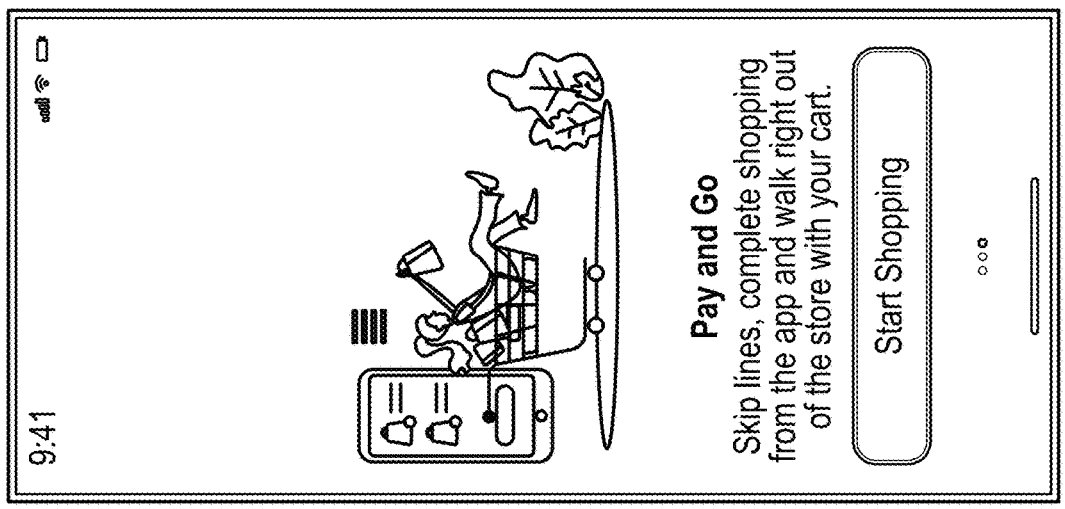
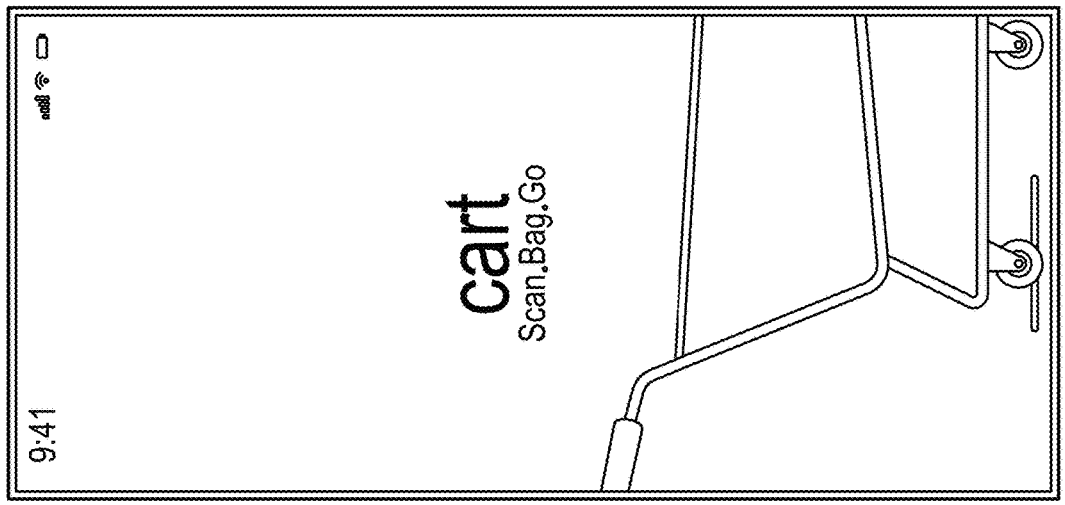

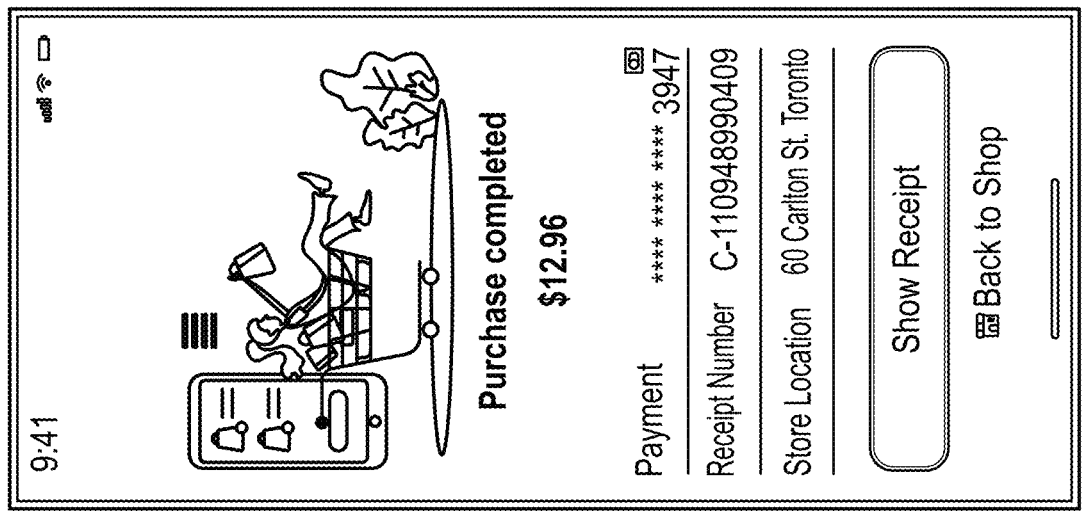

IoT Payment Gateway & Protocol — 600

| Consumer | Merchant Operator | | Financial Institution | Payment Network |
|---|---|---|---|---|
| Customer Device | PoS Device / Security TEEs | IoT Payment Processor, Security PoS Identity / Certificate Authority | Payment Gateway / Identity Verification | Aggregators, Gift Card Networks |

FIG. 6

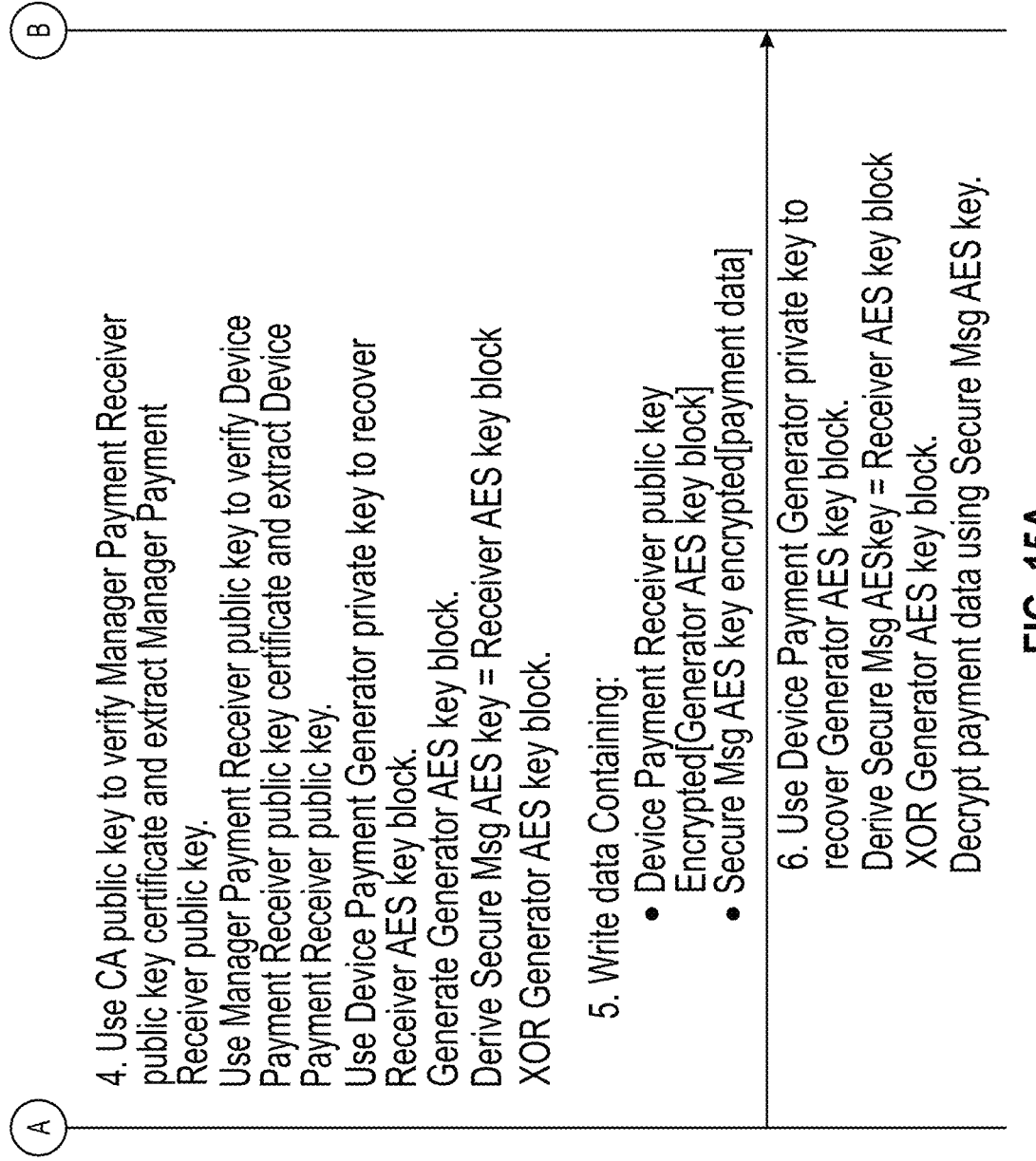

PROTOCOL AND GATEWAY FOR COMMUNICATING SECURE TRANSACTION DATA

CROSS REFERENCE

This application is a non-provisional application, claiming all benefit, including priority to U.S. Application No. 63/165,116, entitled PROTOCOL AND GATEWAY FOR COMMUNICATING SECURE TRANSACTION DATA, filed 23 Mar. 2021, incorporated herein by reference.

This application is related to U.S. Application No. 63/077,443, entitled SYSTEM AND METHOD FOR ELECTRONIC CREDENTIAL TOKENIZATION, filed 11 Sep. 2020, and U.S. application Ser. No. 14/056,440, filed Oct. 17, 2013 and entitled VIRTUALIZATION AND SECURE PROCESSING OF DATA which claimed priority to U.S. Provisional Application No. 61/715,142 filed Oct. 17, 2012; U.S. Provisional Application No. 61/811,783 filed Apr. 14, 2013; U.S. Provisional Application No. 61/825,865 filed May 21, 2013; U.S. Provisional Application No. 61/833,188 filed Jun. 10, 2013; and U.S. Provisional Application No. 61/863,593 filed Aug. 8, 2013; of which all priority applications entitled SECURE PROCESSING AND STORAGE OF PAYMENT DATA.

This application is also related to U.S. application Ser. No. 15/201,428, filed Jul. 2, 2016 which claimed priority to U.S. Provisional Application No. 61/188,067 filed Jul. 2, 2015; U.S. Provisional Application No. 62/200,859 filed Aug. 4, 2015; U.S. patent application Ser. No. 15/000,685 filed Jan. 19, 2016; all of which are entitled SECURE PROCESSING OF ELECTRONIC PAYMENTS.

This application is also related to U.S. application Ser. No. 16/424,242, filed May 28, 2019 which claimed priority to U.S. Provisional Application No. 62/677,133 filed May 28, 2018; U.S. Provisional Application No. 62/691,406 filed Jun. 28, 2018; U.S. Provisional Application No. 62/697,140 filed Jul. 12, 2018; U.S. Provisional Application No. 62/806,394 filed Feb. 15, 2019; and U.S. Provisional Application No. 62/824,697 filed Mar. 27, 2019; all of which are entitled SYSTEM AND METHOD FOR SECURE ELECTRONIC TRANSACTION PLATFORM.

FIELD

Embodiments of the present disclosure generally relate to the field of data communications, and more specifically, embodiments relate to devices, systems and methods for communicating secure transaction data between a plurality of network connected devices.

INTRODUCTION

Internet of Things implementations provide a network of physical objects that are coupled with connectivity components for transferring power and/or data. The physical objects themselves are often low-power, low capability devices that are adapted to economically provide, in concert, a connected, "smart" solution, such as an electronically enabled home having temperature sensors, water leak sensors, among others. Because these objects have low-power and low capability, there are limitations on the complexity of operations that can be performed on them, including limitations relating to communication distances, security, and encryption. There are further limitations due to size and cost.

An increase in 5G adoption and decrease in cost of ownership of IoT devices will lead to a surge in adoption IoT devices, and each machine will need its own identity and ability to act independently (e.g. to pay for things). Furthermore, the payment data may provide visibility and value in real-time insights/decision-making, and encourage investments in infrastructure to support adoption. Establishing machine identity is a core challenge as a potential threat vector comes from devices masquerading as other devices.

Each of the devices need to communicate with other devices, and different protocols have been introduced for doing so. In particular, these protocols are adapted for creating networks out of the Internet of Things devices, and in some cases, the devices are required to connect through a hub for more robust communications.

A deficiency of these approaches is that the architecture is not secure, and malicious devices are able to engage in malicious communications across the network.

NFC based payments are utilized for EMV contactless payments and has seen wide adoption in Canada over the previous decade and slowly gaining adoption in the US.

The standard was built on the foundation of chip and pin also know as "dip" which issuers, acquires and merchant partners are familiar with. The need for proximity also made it a good fit and provided the foundation for mobile contactless payments.

A hindrance to the adoption of NFC payments was the need for hardware upgrades in brick and mortar stores. Being built upon old and familiar standards also has its shortcomings, adding additional data fields for value add services such as loyalty proved to be a hassle and was not worth the investment for many retailers.

Bluetooth, as a protocol, does not provide additional security guarantees and performance improvements over NFC payments, but can be used to enhance the user experience and provide other value added services.

SUMMARY

A surge in IoT devices will lead to an increase in endpoints that are able to initiate payments, and accordingly, a system and corresponding methods and computer readable media are proposed that are adapted to secure communications for making payments, for example, between connected devices. IoT devices can be utilized as an alternative for consumers to traditional payments in a store where customers have to wait in line to pay at a limited number of cashier terminals. The IoT devices can provide proximity payments using communication technologies (e.g., Bluetooth Low Energy, ultra-wideband communications), and can be adapted, for example, to provide a flexible set of payment receiver devices that each act as remote checkout terminals that can be deployed throughout a physical location.

Proposed approaches are described in various embodiments herein directed to mechanisms for mutual authentication approaches that can be used, for example, when introducing new devices into a trusted ecosystem, or periodically authenticating devices in the trusted ecosystem. Mutual authentication is useful in situations where it is important for devices to be able to trust the identity of devices that are being added and to reduce a technical threat vector associated with either fake devices or devices masquerading as other devices (e.g., "device spoof" by a malicious device). The mutual authentication can be conducted between a plurality of device devices, such as between a pair of devices having a first device (e.g., a payment generator device) and a second device (e.g., a payment receiver device), and the mutual authentication can be implemented a series of communication steps between the devices using key certificates and keys for securing the communications. The mutual authentication can be adapted for use over less secure short range communications, such as Bluetooth Low Energy. The mutual authentication steps are provided so that even if intercepted (e.g., in a man in the middle attack), the communications may not be useful for the malicious party. The mutual authentication steps can be implemented through controlled communications by mobile applications residing on, operating on, or otherwise present on either or both of the IoT devices.

The IoT devices operate and communicate with one another to secure communications, and management of the devices can be conducted by a secure payment gateway that communicates with various IoT devices, managing a certificate authority operating alongside backend servers, such as financial payment processing backends and inventory management servers (e.g., for tracking sold inventory or services, and updating stock).

A specific, non-limiting example use case for IoT communications using the proposed mutual authentication approach includes using a first set of IoT devices that operate as IoT payment receiver devices. These IoT payment receiver devices can be strategically located throughout a store, such as a supermarket, and configured to operate each as mobile checkout devices. A number of different IoT payment receiver devices can be flexibility connected to the financial backend through the gateway, for example, based on store demand or busyness level (e.g., increasing the number of devices during a holiday period or major shopping dates, such as Black Friday).

The IoT payment receiver devices, for example, can be provided in a specific "checkout" area, for example, that can be geo-fenced or simply the area within range of the broadcast from their communications interfaces (e.g., Bluetooth Low Energy). In each checkout area, for example, a pillar can be provided having many embedded IoT payment receiver devices disposed therein.

Each of the IoT payment receiver devices then acts as a connectable "checkout" terminal, awaiting connections from customers, who may be walking around the store and scanning items from their physical shopping cart into an application into their device. When the customer is finished and seeking to purchase, instead of standing in line, the customer then simply enters a "checkout" zone, and connects to an available IoT payment receiver device.

A consumer, for example, can then utilize a smartphone that is adapted as a payment generator device that connects to the IoT payment receiver device. The smartphone, for example, could have a Bluetooth Low Energy communications modem controllable by the mobile application for communication with the IoT payment receiver device. Bluetooth Low Energy can be used for limited range communications, but other protocols are considered as well.

One or both of the IoT payment receiver device and the payment generator device, in various embodiments, are coupled to a payment gateway that coordinates and orchestrates communications for processing payment and checkout data flows in accordance with a specialized secure message protocol. The secure message protocol is adapted for utilizing encryption keys and/or device attestations to automatically improve a security level between inter-device communications to reduce a system vulnerabilities (e.g., malicious payment receiver or payment generator devices).

In particular, the payment gateway that is proposed in some embodiments for the IoT ecosystem, enabling secure exchange of payment data between devices, as there are no existing standardized and widely accepted method for two IoT devices to securely make payments, and the IoT payments gateway provides necessary security to attest device identities, as well, ensure secure payments.

The gateway acts as a exchange layer between IoT end-points and existing payment rails, helping secure payment data and also enabling value-add services such as loyalty The gateway mechanism improves the security of data packets for communications between IoT devices when the data packets are used, for example, for handling payment information.

Communicating devices are secured using a trusted execution environment that may be on-board that holds a set of public key/private key encryption key pairs that are established during manufacturing. The trusted execution environment stores the private key securely and the private key is used to attest (sign) or verify communications originating from the trusted device to conduct a secure transaction. Because the public key can be held at the gateway, the gateway can verify that the message was indeed signed by the trusted device.

Example use cases include in-aisle IoT devices where a number of IoT devices located in a grocery store that each become mini point of sale devices so someone doesn't have to check out at a cashier, and a smart parking lot where each parking spot has a smart IoT device that each acts as a secure transaction initiating device.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 2A-2J show example user interface screenshots of an example user experience flow for the first use case, according to some embodiments.

FIG. 6 is a listing of components of an example IoT Payment Gateway, according to some embodiments.

DETAILED DESCRIPTION

As described herein, a proposed gateway (or communication protocol) will act as a exchange layer between IoT end-points and existing payment rails, helping secure payment data and also enabling value-add services such as loyalty.

The gateway is adapted to control and route communications to improve the security of data packets for communications between IoT devices when the data packets are used, for example, for handling payment information.

Figure 1:
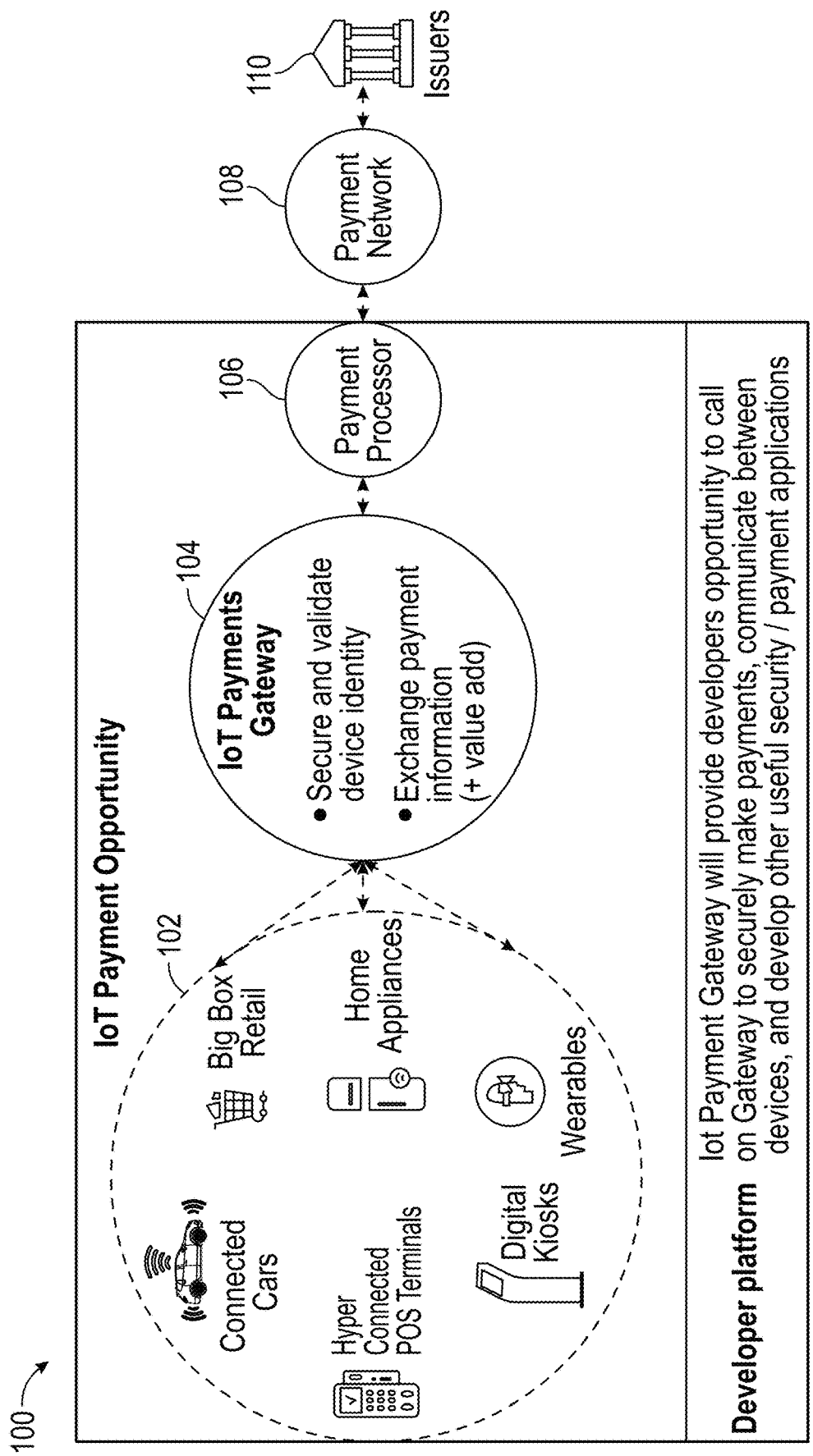
FIG. 1 is an example ecosystem diagram illustrating an IoT payment ecosystem along with a number of potential connected IoT devices and backend payment processing networks, according to some embodiments.

FIG. 1 is an example ecosystem diagram illustrating an IoT payment ecosystem along with a number of potential connected IoT devices and backend payment processing networks, according to some embodiments.

In the diagram 100, the connected IoT devices 102 can include devices such as connected cars, communication devices present at various retail stores (e.g., supermarkets), connected point-of-sale terminals, home appliances, digital kiosks, and wearables, among others, which are coupled, either directly (e.g., connected by WiFi or Bluetooth) or indirectly (e.g., using an ad-hoc connection or sending packets through another IoT devices) to the IoT payments gateway 104, which is adapted to securely validate a device's identity and allow it to exchange payment information to a payment processor engine 106, which can be coupled to a backend payment network 108 and ultimately issuers 110. In some embodiments, the issuers 110 provision a certificate to the IoT device which will be further used for mutual authentication and secure communication to the server, for example, through a secure network connection from the issuer 110 to should be able to establish secure communication from the application on the IoT device to the issuer 110's servers, and logs may be collected for diagnostic and troubleshooting purposes.

In a first use case, the connected IoT devices 102 may be configured to communicate using Bluetooth Low Energy (BLE), and utilize BLE communications to conduct payments between two or more devices. In this example, in-aisle payments can be conducted at a supermarket using a retailer's Scan & Go application. See, for example, FIG. 2A to FIG. 2J.

The connected IoT devices 102 are utilized to further 'technify' checkouts by providing multiple end-points for check-out that will shift a larger portions of payments to in-store touchless transactions such as in-aisle payments, using automation to help save costs (reducing dependency on slower, traditional checkout) and to provide an improved user experience. Mutual authentication approaches are used between a plurality (e.g., a pair) of connected IoT devices 102.

Mutual authentication is the process by which two applications that need to communicate validate are legitimate. In the context of the IoT payment, mutual authentication refers to the authentication between the two device exchanging payment data. An example mutual authentication approach is shown in more detail at FIG. 15A and FIG. 15B.

In a traditional point of sale transaction, there is no mutual authentication between the card and the point of sale terminal, whether physical or loaded digitally onto a mobile device. Offline data authentication is an approach in EMV that is used for validating whether the card which is used for payments is a valid card through a hierarchy of Issuer and Payment scheme PKI. Physical cards do have support for this, but most POS terminals do not require this flow to be supported as most transactions are now online (i.e., the cryptogram verification requester goes to the issuer or someone that the issuer delegated the process to).

This is true in the case for BLE where the issuer accepts the payments to be authorized online. In the current point of sale setting, the user performing the transaction is at a proximity with the terminal to either tap, swipe, dip or scan (in the case of QR code payments) their card and credentials at the point of sale terminal.

BLE (and other similar technologies that may be utilized for IoT devices) however, does not require proximity, hence there is the additional need for establishing mutual authentication before the exchange of sensitive data.

FIGS. 2A-2J show example user interface screenshots of an example user experience flow for the first use case, according to some embodiments. This experience flow may be provided, for example, by a mobile application on the customer's device that is capable of controlling communications using a modem (e.g., a Bluetooth Low Energy modem) on the device. The customer has loaded the mobile application, and in some embodiments, the customer already has an account with the merchant, or is using a guest account. The customer's mobile application effectively turns the customer's mobile device into a IoT payment generator device.

The customer enters the premises of the store, and begins walking around and adding items into a physical shopping cart, for example.

The customer also loads the application and uses during the shopping process. In FIGS. 2A-2C, at example interface screens 202, 204, 206, a customer may be able to scan various QR codes or bar codes to add items to a cart. At FIG. 2D, the customer scans the code on the food item, and it is added to the cart. At FIG. 2E, the item is added to the cart, and other offers may be surfaced, for example, based on what as added to the cart presently, in the past, or estimated to be added in the future.

During this process, the customer's virtual cart has records of all the items that have been scanned, and for example, a tally of cost and/or pricing can be maintained so that the customer is able to see a running subtotal.

When the customer is ready to finalize the transaction, the customer can head over to a "checkout zone" where IoT devices are residing. This zone could be a geofenced region, or a demarcated physical region where the IoT devices act as virtual "checkout staff". A benefit of this approach is that the physical security threat footprint is minimized to the small area of the checkout zone, while the number of virtual "check out staff" can be dynamically adjusted simply by adding or removing IoT payment receiver devices from each zone.

Each IoT payment receiver device may handle a number of transactions serially or in parallel, and when the number of communication pathways are saturated or the device is at a pre-defined limit, a communications queue can be established where payment generator devices are queued for payment. In some embodiments, where there are active payment generator devices queued for payment, a signal may be sent to a backend system to activate more IoT payment receiver devices, or to send a request to bring more IoT payment receiver devices to service the specific "checkout zone".

Figure 2F:
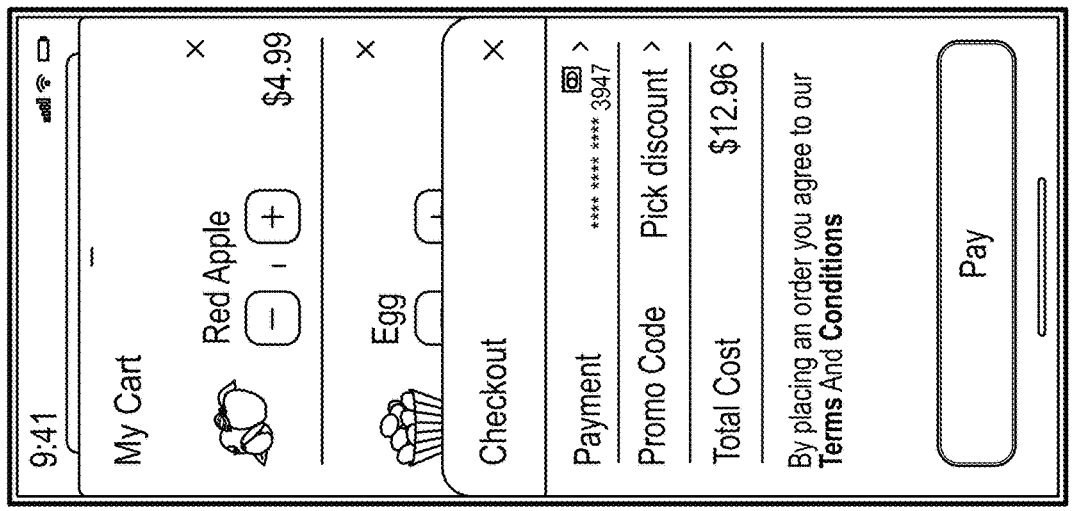
Figure 2E:
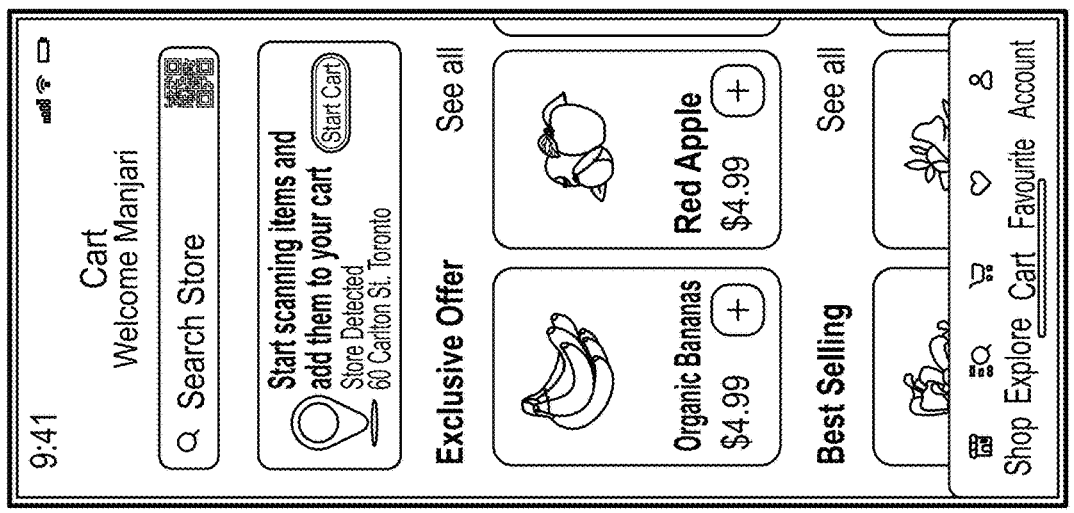
Figure 2D:
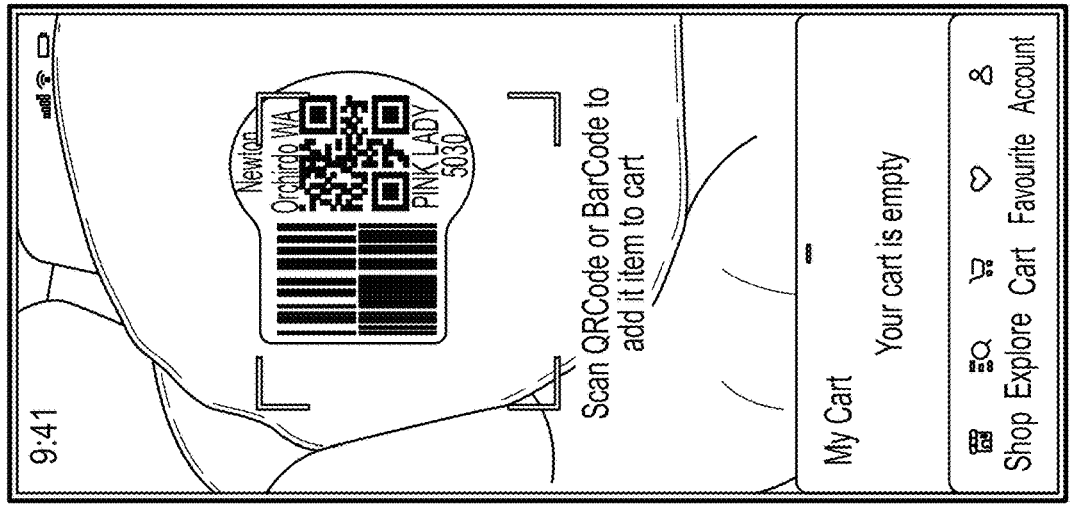
Figure 2I:
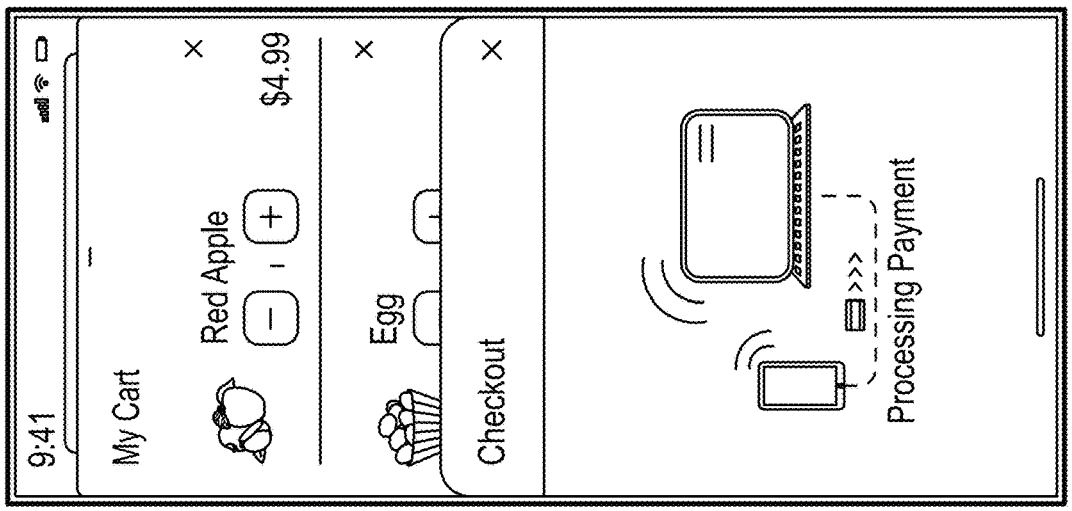
Figure 2H:
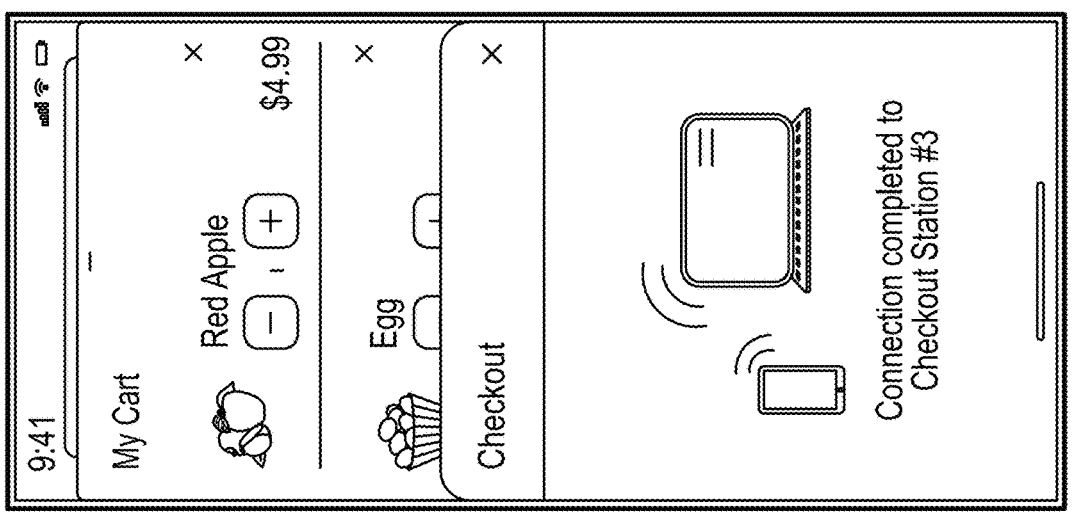
Figure 2G:
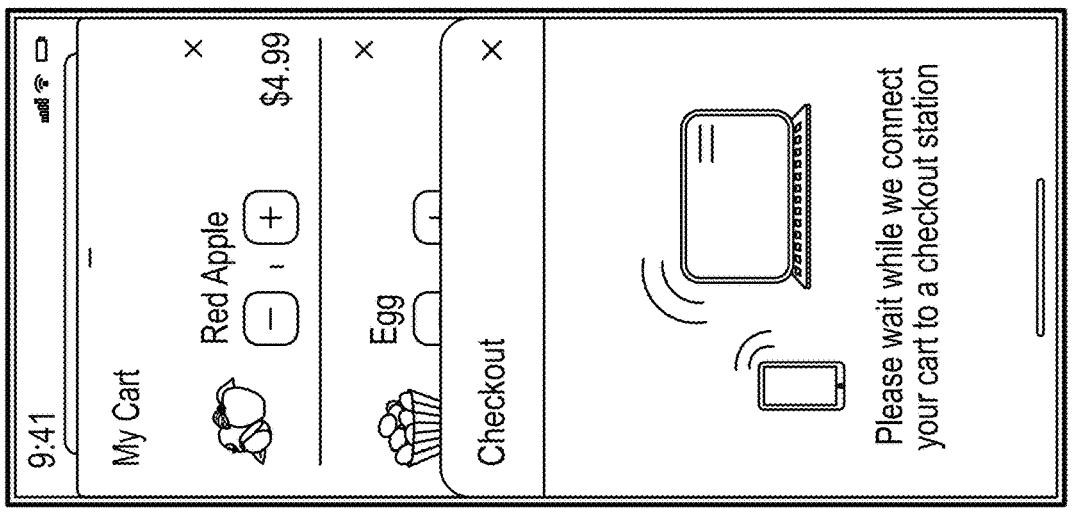

At FIG. 2F, a checkout screen is shown. At FIG. 2G and FIG. 2H, the customer's smartphone connects to the IoT checkout station (in this case, Station #3), which initiates an IoT payment process whereby a payment is processed at FIG. 2I. At FIG. 2J, a purchase completion confirmation page is shown to the customer.

Figure 3:
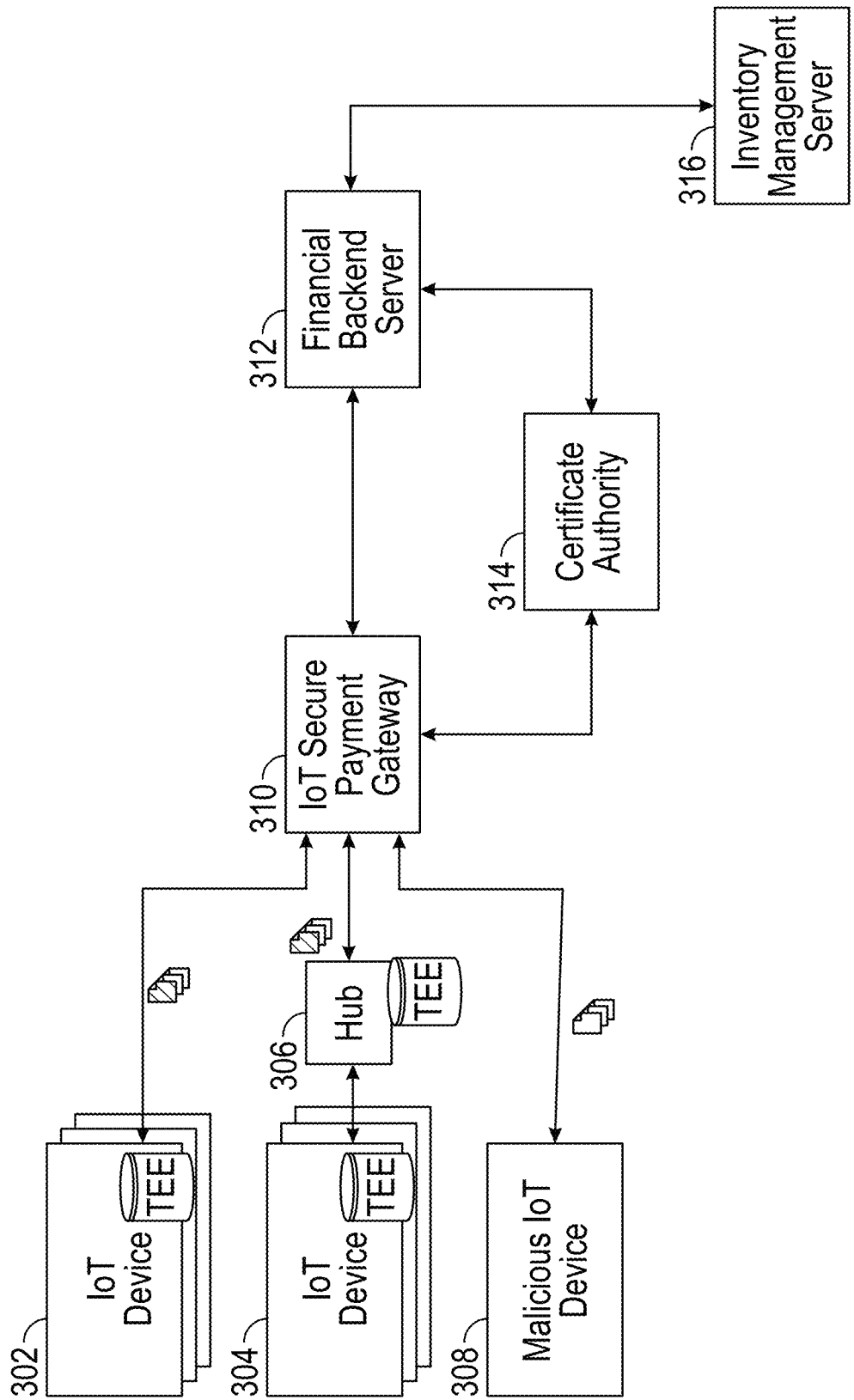
FIG. 3 is an example block schematic of the ecosystem diagram of FIG. 1, according to some embodiments.

FIG. 3 is an example block schematic of the ecosystem diagram of FIG. 1, according to some embodiments.

In FIG. 3, IoT devices 302 and 304 can include groups of devices that each have their own trusted execution environment (TEE), and are secured using a trusted execution environment that may be on-board that hold encryption keys, such as a set of public key/private key encryption key pairs that are established during manufacturing.

The TEE can utilize isolation properties of a hardware module or circuit to provide a secure processing environment. Any sensitive data including payment related data or potential PII data will need to be processed inside this isolated environment and communicated to the server in a secure manner.

The server will need to be able to validate with cryptographic proofs from the root of trust that the transaction has been sent from a genuine processing device with security properties intact.

The TEE may have the following properties: secure random number generation, generation of non-exportable asymmetric private keys (preferably NIST approved elliptic curve based public and private key pairs), code isolation and secure processing of logic that is protected from the host operating system and any peer applications running on the host operating systems, and a global platform TEE certification mechanism to validate the above.

In some embodiments, the IoT device 304 may also connect through a hub 306 which may optionally also have its own TEE. Encryption can include using a RSA secret generation mechanism, or other approaches such as ECDH,
among others. The keys can be directly embedded, for example, at a chipset, system on a chip, or printed circuit board level. The data being transferred should be protected at transport and at the message layer, in some embodiments, and for example, data is protected at the application level via shared key between mobile device and server, and transport level encryption can be provided through a communications protocol specification (e.g., using Bluetooth capabilities).

The trusted execution environment stores the private key securely and the private key is used to attest (sign) or verify communications originating from the trusted device (or hub 306) to conduct a secure transaction. Because the public key can be held at the gateway, the gateway can verify that the message was indeed signed by the trusted device. In some embodiments, trusted devices without TEE can also connect through hub 306, and be secured by the hub 306's TEE.

In a further embodiment, the devices may be configured to mutually authenticate each other at the application layer before exchange of sensitive data, where the mobile device is able to authenticate the IoT gateway, and vice-versa. In an alternate embodiment, the data is protected from the mobile device to the payment processing server end to end so there is no hard requirement to authenticate these two devices.

The devices 302, 304, or hub 306 may communicate secure payment information through secure data communications with an IoT secure payment gateway 310, and in some embodiments, the TEEs are utilized to encrypt and/or attest information such that the keys stored onboard can be utilized as certificates to be validated at a certificate authority 314, which may be configured to manage certificates.

In some embodiments, the IoT devices 302 are coupled to one another (e.g., in an adhoc network) where one device 302 has another device 304 relay a message to the gateway 310. In some embodiments, as each TEE has a secret key or a parameter that cannot be changed established during manufacturing, and the certificate authority can utilize a known aspect of the secret key or parameter (or in some instances, a copy of the secret key or parameter) to determine that the data communication did indeed come from the device associated with the TEE. To reduce the likelihood of replay attacks, in some embodiments, the messages are encrypted or encapsulated with a time-varying aspect such that the encryption or signing is only valid for a short duration of time. Other security countermeasures are possible.

The IoT secure payment gateway 310 may be coupled with a financial backend server 312 adapted for processing payments, which may be further coupled to an inventory management server 316 to update inventory and/or stock levels.

A malicious IoT device 308 may be connected to the IoT gateway 310 that attempts to send a malicious message. Because the malicious device 308 does not have a TEE, the IoT gateway 310 may flag the payment transaction message as suspicious and/or fraudulent as it cannot look up or validate the identity of the malicious IoT device 308. The malicious device 308 may also be missing the requisite information and cannot conduct a mutual authentication.

This is a cybersecurity improvement relative to other protocols, such as simply connecting to wireless networks using known SSIDs and passwords to join a common network, or connecting to any available Bluetooth device that is broadcasting a pairing single. The mutual authentication provides an improved handshaking mechanism that can be used for secure communications.

Figure 4:
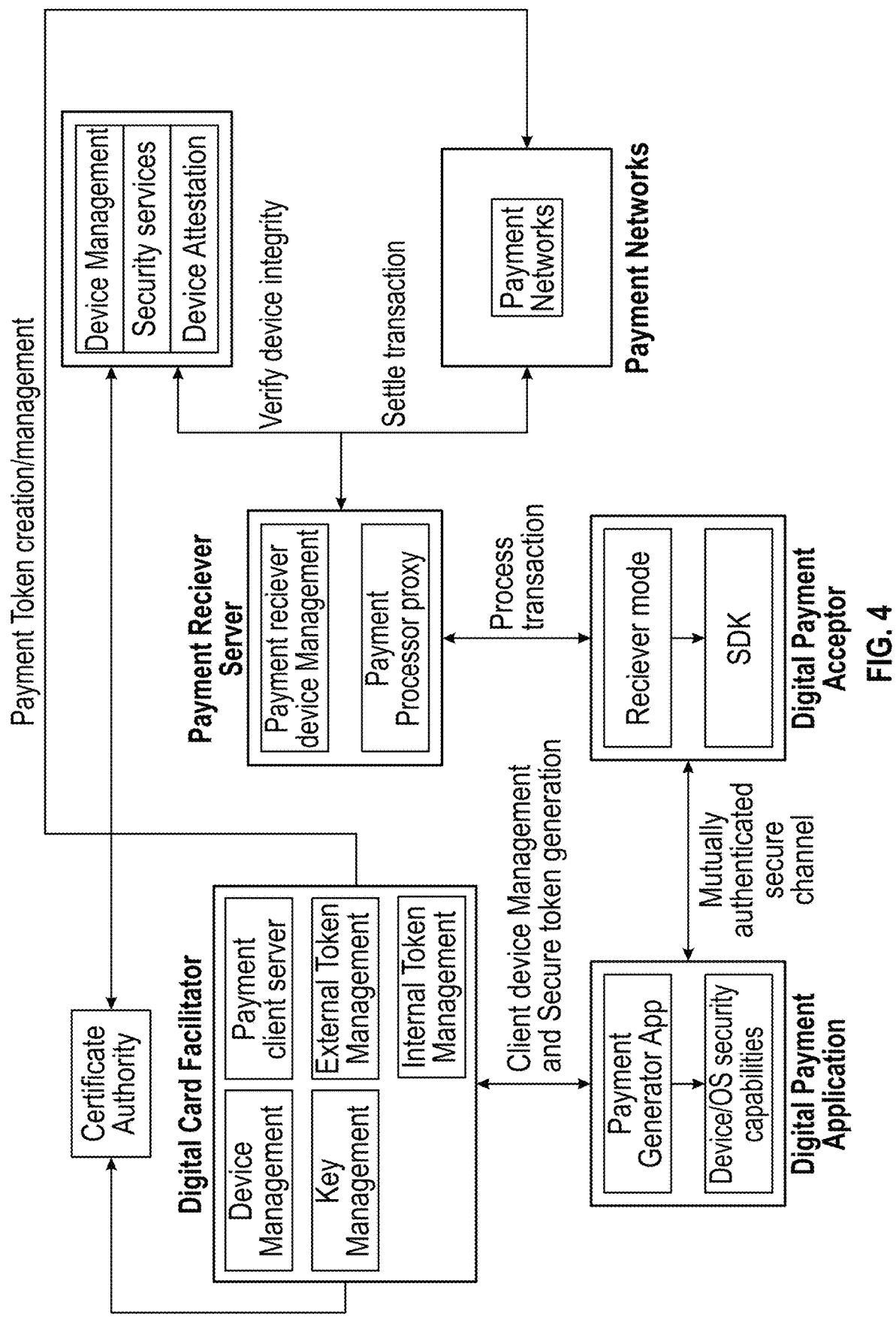
FIG. 4 is an example schematic of the system of FIG. 1, showing a set of mechanisms utilized for secure token generation, payment receipt and processing, device integrity verification, and device attestation, among others.

FIG. 4 is an example schematic of the system of FIG. 1, showing a set of mechanisms utilized for secure token generation, payment receipt and processing, device integrity verification, and device attestation, among others.

Figure 5:
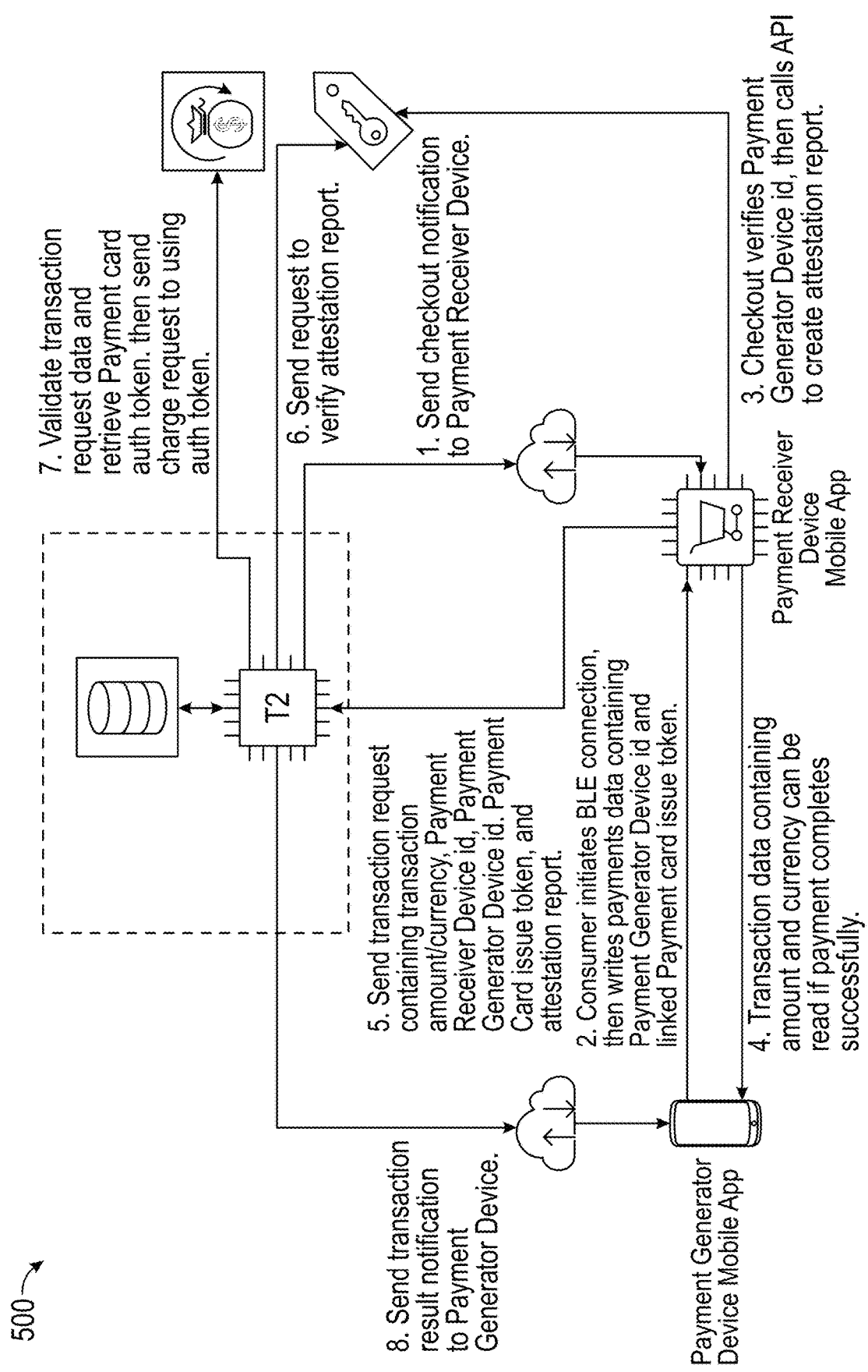
FIG. 5 is a process flow diagram illustrating steps of a transaction, beginning with the sending of a checkout notification to a payment receiver device, from a cloud based payments gateway service.

FIG. 5 is a process flow diagram 500 illustrating steps of a transaction, beginning with the sending of a checkout notification to a payment receiver device, from a cloud based payments gateway service.

The illustrated process flow is adapted as an alternative to traditional approaches where one has to queue in line to conduct a payment at the terminal in store. For example, in typical payment situations, an individual would queue in line at one of many checkout terminals to await a turn to pay, and such approach is limited by a number of cashiers or checkout lanes as each of the checkout terminals pays using a particular point of sale device that is sequentially approached and utilized.

Instead, the proposed approach shown in FIG. 5 illustrates a proximity communications based payment, where a number of IoT payment receiver devices are strategically located and/or positioned throughout a facility to facilitate payments. The communications technology shown in many examples herein is based on Bluetooth Low Energy (BLE) technologies, but other technologies are possible, such as ultra wide-band communications, among others. The payment receiver device, in some embodiments, can be portable and moved around to establish payment zones from which the payment receivers can be connected. As store layouts change, the payment receiver devices can be repositioned accordingly.

The payment generator device in this example is a customer's smartphone or mobile device, and the payment generator device is coupled with a mobile application or on-board functionality which is adapted for conducting an electronic payment transaction as described in various embodiments herein. The payment generator device, for example, can include a device that is adapted for scanning items, or encoding representing items (e.g., barcodes, QR codes) or loading pushed indications of services provided, among others. These items requiring payment can be digitally represented, and stored on a digital shopping cart.

At Step 1 in FIG. 5, the customer is ready for payment, and, in some embodiments, can move to enter a geofenced "payment zone" where the payment generator device is capable of engaging in a proximity communication channel with the payment receiver device, which in this example, is the strategically located IoT device that acts as an improved checkout terminal that can handle many transactions in parallel, thus obviating the need for checkout lines).

At Step 2, the payment generator device then initiates the proximity communication channel (e.g., BLE connection), and payment data objects can be provided along with linked payment card tokens and/or credentials to be sent to the payment receiver device.

At Step 3, the payment receiver device is adapted to verify the credentials of the payment generator device, and an attestation report is requested from an edge services engine. The attestation report can be utilized even, in some embodiments, for two devices that are operating peer to peer, without specific secure element processors on-board.

At Step 4, transaction information can be returned to the payment generator device to indicate that the payment amount and currency.

At Step 5, a transaction request is transmitted to a cloud-based backend processing engine, represented as a data object containing data values and fields corresponding to transaction amount, currency, payment receiver device ID, payment generator device ID, payment card issue token, and the attestation report, for example.

At Step 6, a request to verify the attestation report is sent to the edge services engine, and on a successful verification, at Step 7, the transaction request is verified and transmitted to a payment processing engine.

At Step 8, a transaction result can be provided to the payment generator device, which, for example, can be represented as a QR code or a digital data object (e.g., signed using an encryption key) that can be used by the customer for presentation to show that the items have been successfully purchased.

The digital data object can be used in place of receipt checks during exit, and in some embodiments, a graphical display element is rendered on a display of the smartphone or portable device with the receipt, and an attendant can conduct a manual check of the information provided on the screen. In another embodiment, the digital data object can be transmitted or otherwise provided at a non-attended exit, such as a mantrap or a turnstile, which requires a payment data object corresponding to the purchased items to be validated prior to unlocking a latch for an exit. An individual, for example, could tap a smartphone or use another proximity device to communicate the digital data object.

As the proposed solution can handle multiple requests from payment generator devices simultaneously, the proximity technology-based payments approach is a useful mechanism that can be adapted to fit within current infrastructure, and can be deployed with minimal deployment changes. In view of investment in existing payment processing rails and associated regulations and standard protocols, the processing messages can be adapted to align with existing message flows during a systems retrofit, operating as an adapter or interface that operates between the merchant and issuer computing devices.

The system can be interacted with, for example, through an API as an interface, for example, through a disseminated software development kit, or in another embodiment, as a mobile application for provisioning on either or both of the payment generator and the payment receiver devices.

A technical challenge that arises with proximity payment messaging is that security across electronic communication channels needs to be addressed, as there is an increased potential attack surface relative to approaches that require very close physical proximity or reading of data directly from a payment card, such as a tap, a swipe, a card insertion, etc. There are different approaches for addressing security, and the proposed approaches of some embodiments herein is adapted from a payment perspective, adapted to maintaining industry standard data protection and cybersecurity policies and protecting communication channels using encryption and attestations.

FIG. 6 is a schematic 600 showing a listing of components of an example IoT Payment Gateway, according to some embodiments.

The payment receiver device, for example, can be an IoT device having software, such as a mobile application, that is adapted for secure payments/checkouts.

The consumer, through the consumer's mobile device (payment generator device), initiates a BLE connection that writes payments data containing the payment generator device identifier and a linked payment card issue token to the payment receiver device. The payment generator device then verifies the payment generator device ID, and calls an edge processing API to generate an attestation report.

Transaction data containing an amount and currency, for example, encapsulated, as a data packet, can be read by the payment generator device if a payment data process completes successfully.

The payment receiver device then sends a transaction request data message containing a transaction amount/currency, payment receiver device ID, payment generator device ID, a payment card issue token, and the attestation report to the payment processor engine, which then sends a request to verify the attestation report from an edge processing server.

Upon successful verification, the transaction request data is validated and a payment card authorization token is retrieved, to be sent to a financial payments processor backend using the authorization token. The transaction result can be sent to the payment generator device (e.g., your payment was completed successfully).

Figure 7:
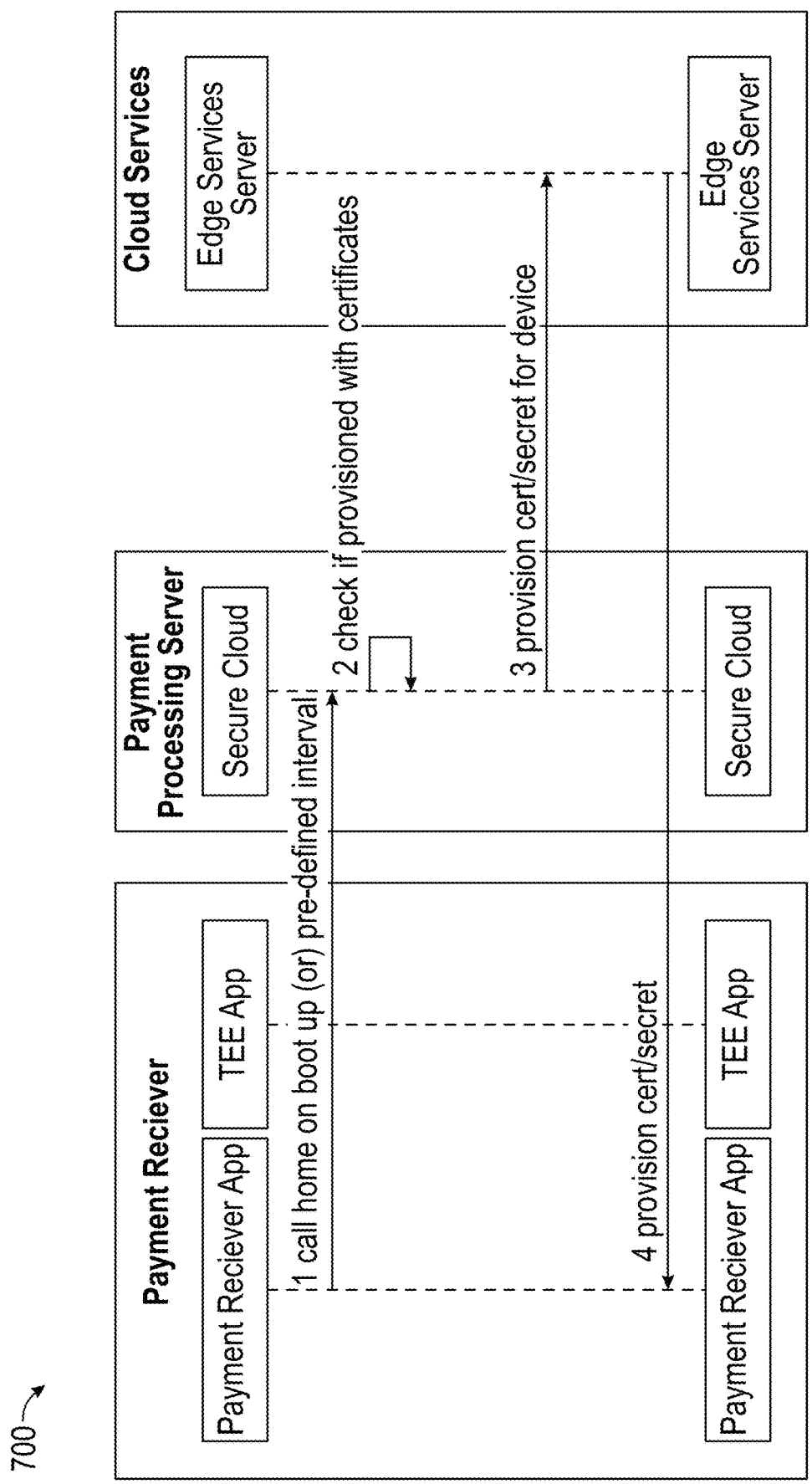
FIG. 7 is an example process flow for IoT device registration, according to some embodiments. This step may run on device setup or on a pre-determined interval to validate that the device is in good health and provision with a token attesting the device and a set of certificates for authentication and data encryption.

FIG. 7 is an example process flow 700 for IoT device registration, according to some embodiments. This step, for example, may be configured to run on device setup or on a pre-determined interval to validate that the device is in good health and provision with a token attesting the device and a set of certificates for authentication and data encryption.

Figure 8:
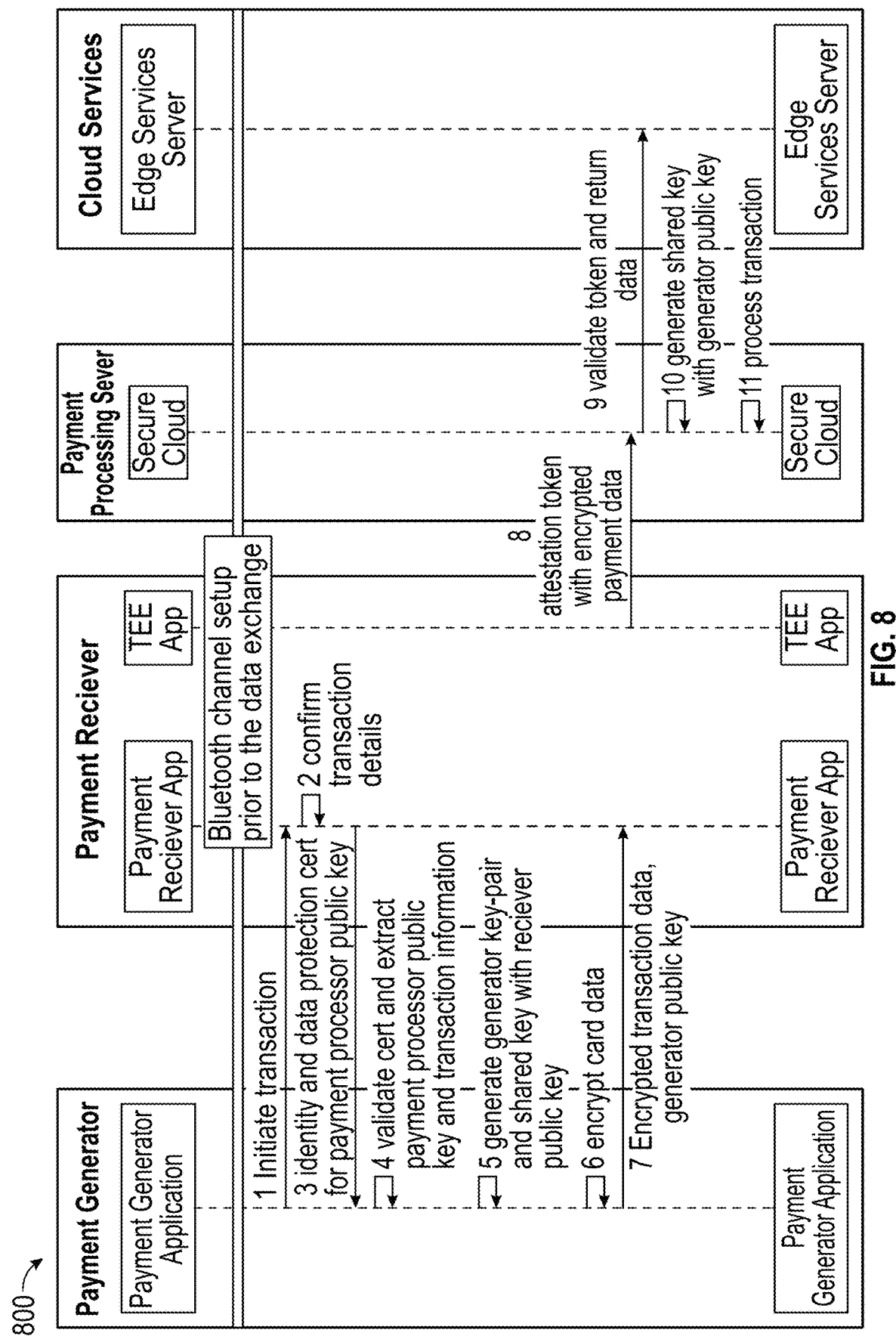
FIG. 8 is an example payment transaction flow, according to some embodiments.

FIG. 8 is an example payment transaction flow 800, according to some embodiments. An approach is shown that is an example approach where there is a proximity channel that is established prior to a data exchange (Bluetooth channel set up prior to the data exchange).

A communication channel is established between the payment generator device (e.g., customer's smartphone) and the payment receiver device (e.g., IoT device for handling purchase transactions), and in this example flow, it is important that from a security perspective that the payment generator can identify the payment receiver before exchanging any sensitive data.

A trusted execution environment, in some embodiments, is a protected file system or file storage operated by a special high security processor that may be segregated from other computing functionality, and the trusted execution environment may be present on the payment receiver device for securely generating and communicating attestation tokens so that a payment processing server is able to validate and/or verify the identity of the payment receiver device prior to processing any payments.

This is particularly important in view of potential issues related to attempts at "spoofing" or otherwise conducting malicious activities (e.g., false purchases, returns) through the provisioning of a falsified payment receiver device by a malicious third party.

A transaction is initiated, and confirmation details are confirmed. The payment receiver device provides identity and data protection certificates for payment, and these certificates are validated by the payment generator device. Keypairs are generated, and transaction data along with public keys are transmitted to the payment generator. The payment generator uses a coupled trusted execution environment to prepare and transmit an attestation token with encrypted payment data to a payment processing data, which then validates the token, creates a shared key using the payment generator's public key, and processes the transaction.

Figure 9:
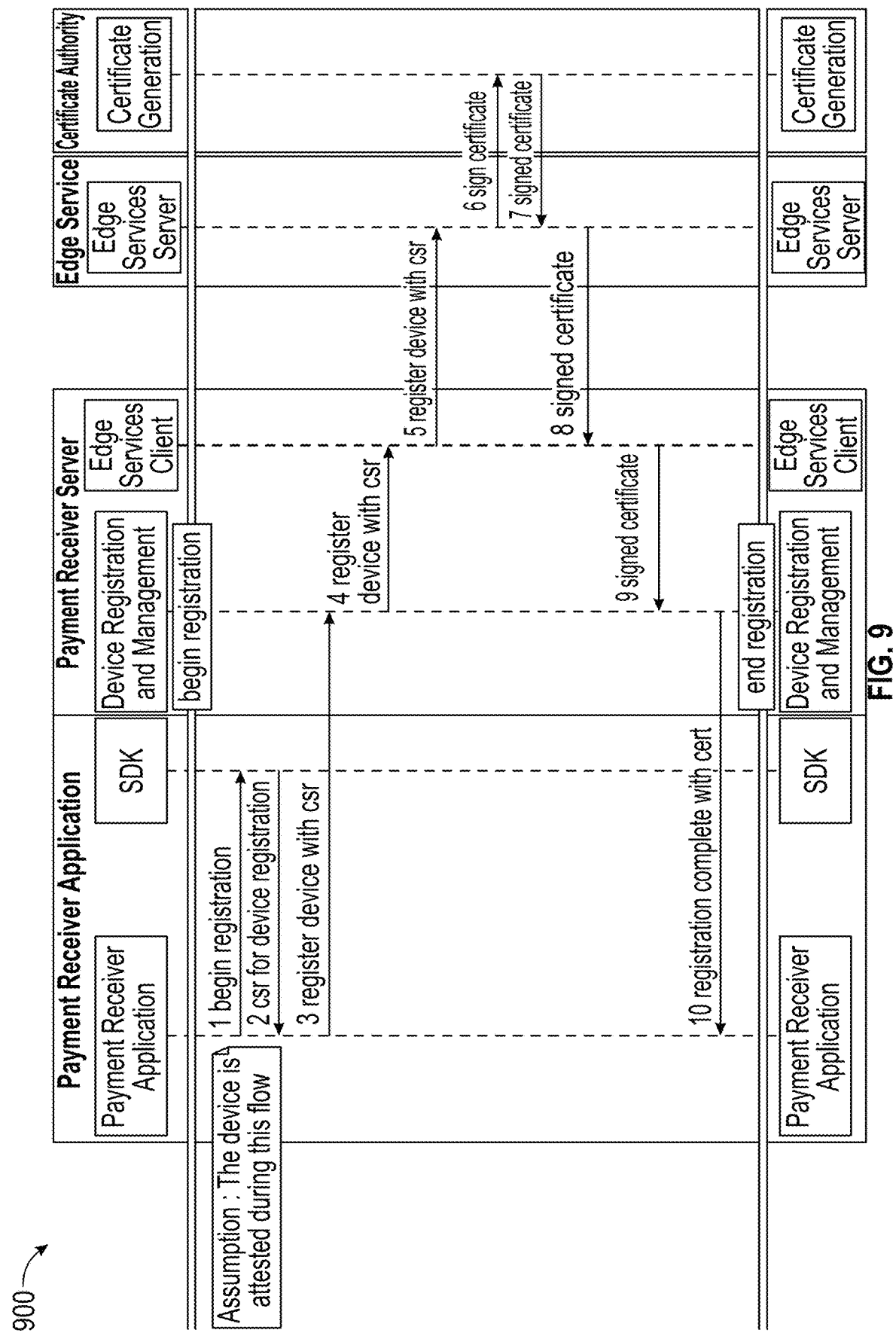
FIG. 9 is an example process flow for registering a device to obtain a signed certificate, according to some embodiments.

FIG. 9 is an example process flow 900 for registering a device to obtain a signed certificate, according to some embodiments.

A process flow is shown whereby the payment receiver device can interoperate with a certificate authority for conducting device registration. In this example, a registration processes is used between the payment receiver device for registration, and in the registration process, communications are made with certificate authorities for certificate generation through communications between edge services servers and clients.

Figure 10:
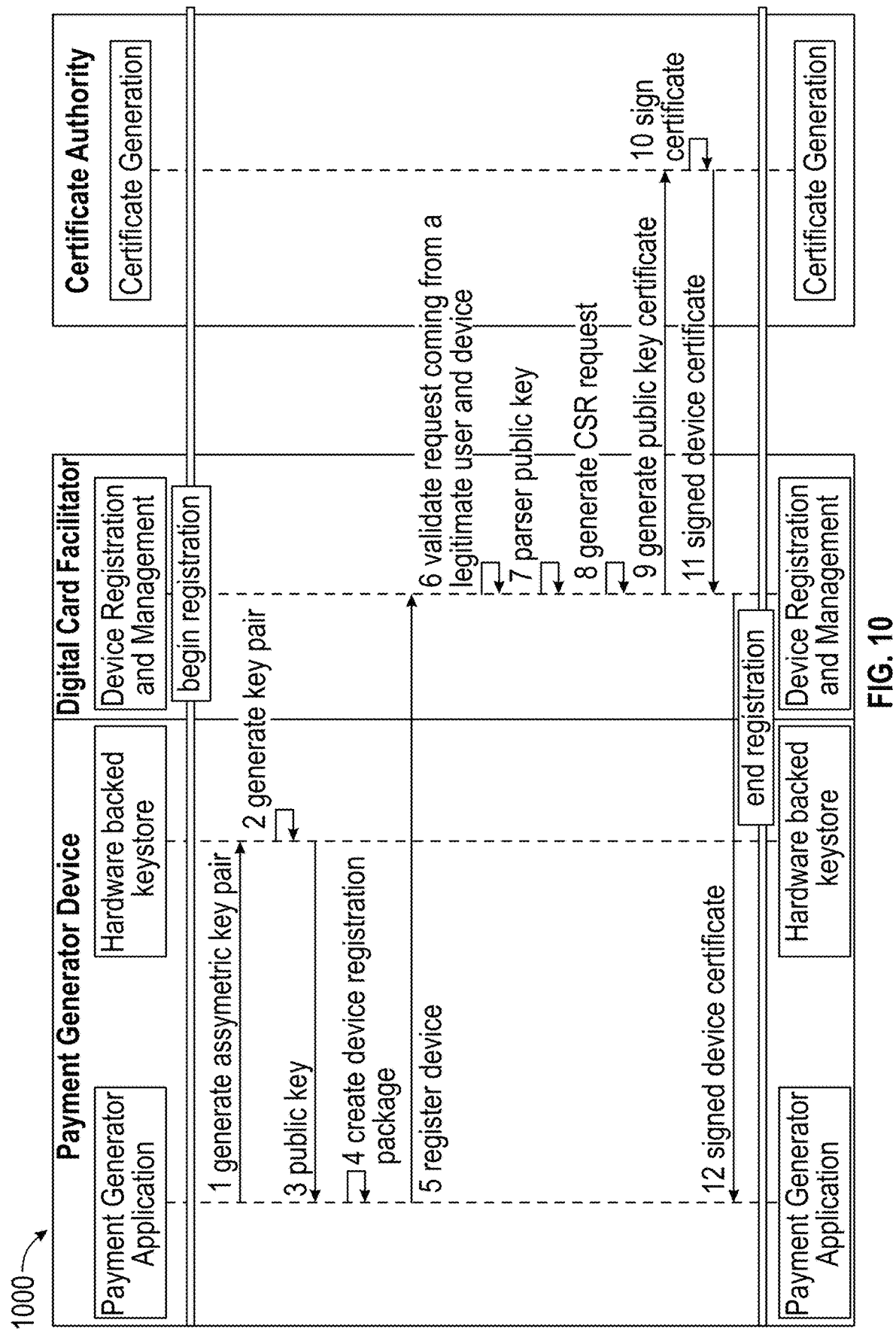
FIG. 10 is an example process flow for registering a payment generator device where a signed device certificate is obtained from the certificate authority, according to some embodiments.

FIG. 10 is an example process flow 1000 for registering a payment generator device where a signed device certificate is obtained from the certificate authority, according to some embodiments. A hardware backed keystore can be used for secure keypair generation.

A process flow is shown whereby the payment generator device can interoperate with a digital card facilitator and a certificate authority for conducting device registration.

This process flow can be utilized to establish a card token object (e.g., credit card, debit card) which can then be utilized in the future for supporting a payment transaction initiated by the payment generator device.

An asymmetric keypair is generated, and the public key is used for a registration of the device. A digital card facilitator device is used to create a public key certificate, which is then signed by a certificate authority server and returned to the payment generator application.

Figure 11:
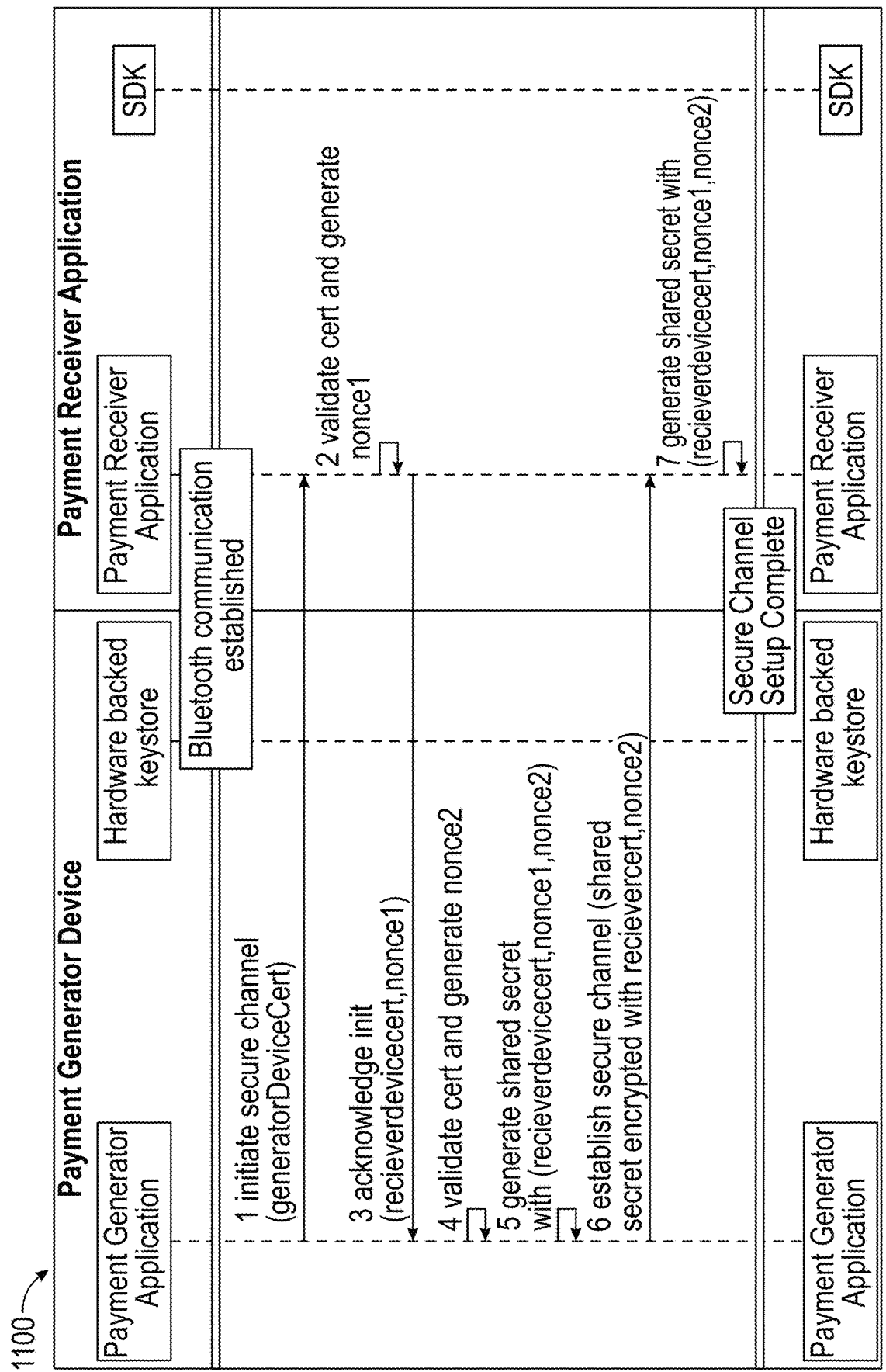
FIG. 11 is an example process flow for generating a shared secret between a payment generator device and a payment receiver application, according to some embodiments.

FIG. 11 is an example process flow 1100 for generating a shared secret between a payment generator device and a payment receiver application, according to some embodiments.

In this process flow, a series of steps are shown for establishing a secure communication channel between the payment generator device and the payment receiver device. As shown in this example, a shared secret and a nonce, among other aspects, can be utilized to establish a shared channel as between the two devices.

The secure channel is used to validate certificates sent by the payment generator device, and the payment receiver generates a first nonce, which is sent back to the payment generator device, who generates a second nonce and a shared secret generated from both the certificate, as well as the two nonces). Each side is able to generate the shared certificate using the nonces and the certificates, and a secure channel can be thus set up.

Figure 12:
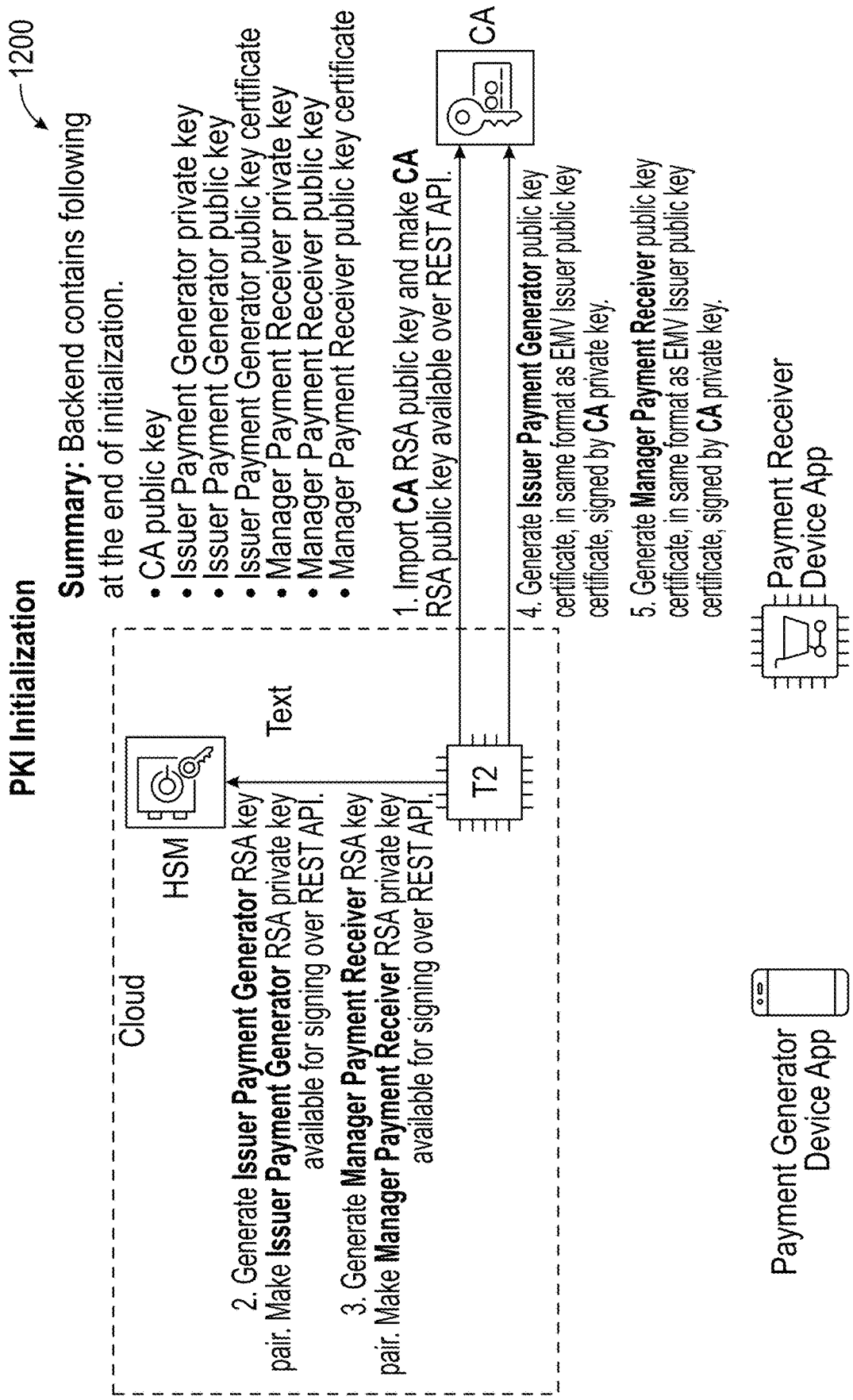
FIG. 12 is an example process flow for PKI initialization, according to some embodiments.

FIG. 12 is an example process flow 1200 for PKI initialization, according to some embodiments. This approach is utilized to utilize key certificates to establish payment generator and payment receiver public/private keypairs and corresponding certificates, which can be issued, generated, and/or revoked by a certificate authority server.

Figure 13:
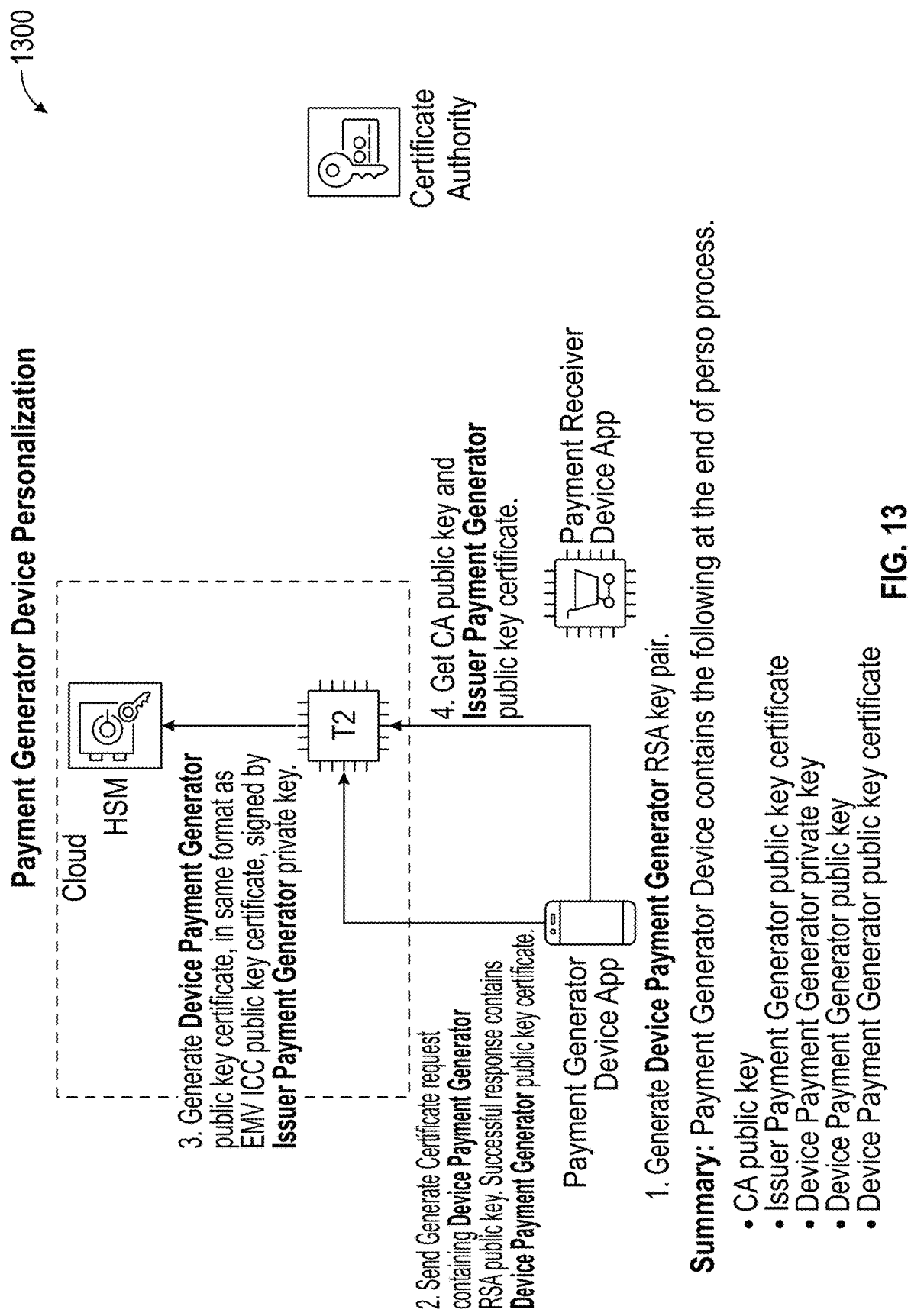
FIG. 13 is an example process flow for payment generator device personalization, according to some embodiments.

FIG. 13 is an example process flow 1300 for payment generator device personalization, according to some embodiments.

In this process flow, the payment generator device initiates a request for generation of certificates, the request including a device payment generator public key, and the backend responds with a corresponding set of data objects that will be utilized during a payment process, including a certificate authority public key, an issuer payment generator public key certificate, a payment generator device public/private key pair, and a device payment generator device public key certificate.

After the personalization, the payment generator device is populated with a certificate authority public key, an issuer payment generator public key certificate, a keypair for the payment generator device, and a corresponding certificate.

Figure 14:
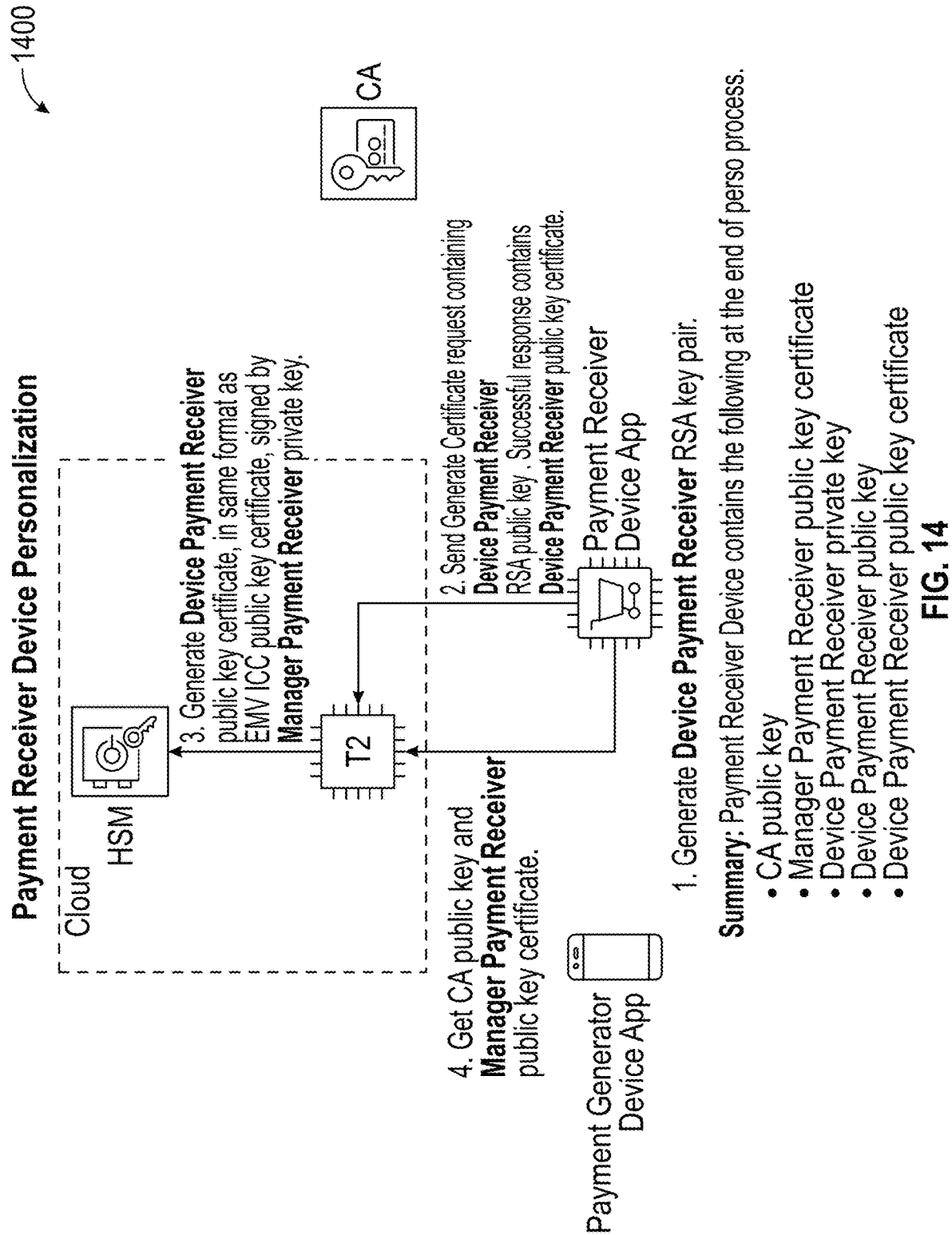
FIG. 14 is an example process flow for payment receiver device personalization, according to some embodiments.

FIG. 14 is an example process flow 1400 for payment receiver device personalization, according to some embodiments.

In this process flow, the payment receiver device similarly initiates a request for generation of certificates, the request including a payment receiver device public key, and the backend responds with a corresponding set of data objects that will be utilized during a payment process, including a certificate authority public key, a manager payment receiver public key certificate, a payment receiver device public/private key pair, and a device payment receiver device public key certificate.

As noted, after the personalization process, the payment receiver device is populated with the certificate authority public key, a manager payment receiver public key certificate, a keypair for the payment receiver device, and a corresponding certificate.

Figure 15A:
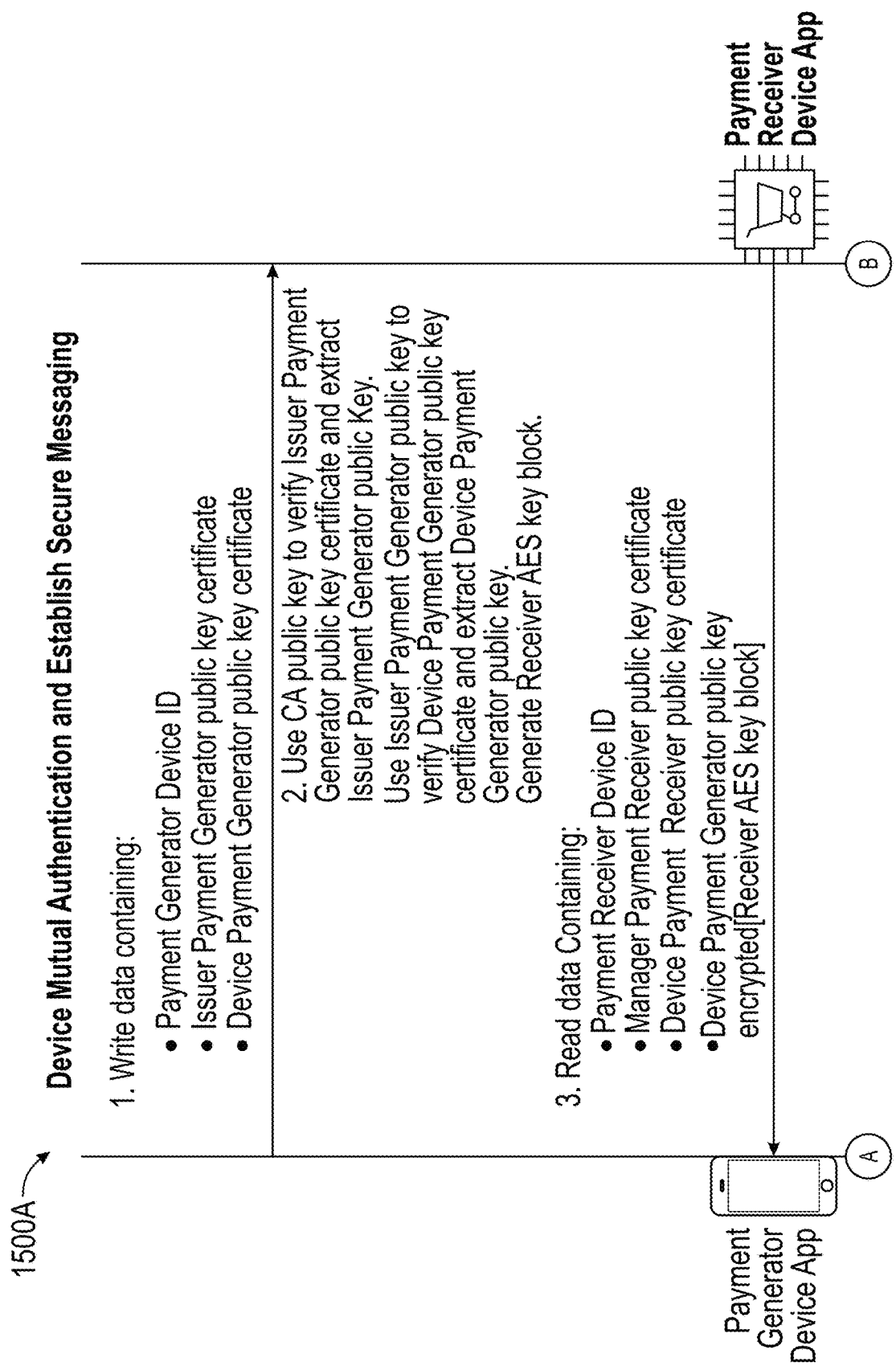
FIG. 15A is an example process flow for device mutual authentication and secure messaging establishment, according to some embodiments.

FIG. 15A is an example process flow 1500A for device mutual authentication and secure messaging establishment, according to some embodiments. The mutual authentication process uses the certificates generated during the personalization processes of FIG. 13 and FIG. 14.

A problem that arises with traditional approaches is that while traditional payment cards include electronics or other identifiers for use in verifying that the card is indeed a trusted card, there are no existing mechanisms that can be used by the card to verify that a terminal is a trusted terminal. For this reason, there can be fraud, for example, in traditional approaches when a valid card is inserted into a fraudulent terminal. However, the potential for fraud is mitigated in traditional payment scenarios as there is often an attendant or a limited number of payment terminals provided in secure locations. This problem is more challenging when the terminal is capable of connecting through proximity communications, and deployed, for example, by a trusted terminal manager, which could be adapted for provisioning, verifying, and revoking credentials of one or more payment receiver devices disposed throughout a facility. A communication flow is shown between the payment generator device and the payment receiver device, and in this example process flow, the two devices conduct a mutual authentication process for establishing a secure messaging channel. The mutual authentication is particularly important as proximity communications are vulnerable to cyberattacks and/or interception, and validated trust can be established through the exchange of keys established during the generation processes. Mutual authentication can be utilized to mitigate potential risks whereby, for example, a malicious user obtains an un-provisioned payment receiver terminal and attempts to skim card information from payment generator devices, and, for example, utilizes this for fraudulent transactions into their own bank accounts.

FIG. 15A is described from the perspective of the payment generator device, which is adapted to communicate to with the payment receiver device through transmitting data messages and receiving response data messages. While some of the example blocks have AES encryption shown, it is to be noted that other types of encryption are possible as well, such as other types of block ciphers, such as Blowfish, RC5, IDEA, DES, or other variations of Rijndael type ciphers, among others.

Figure 15B:
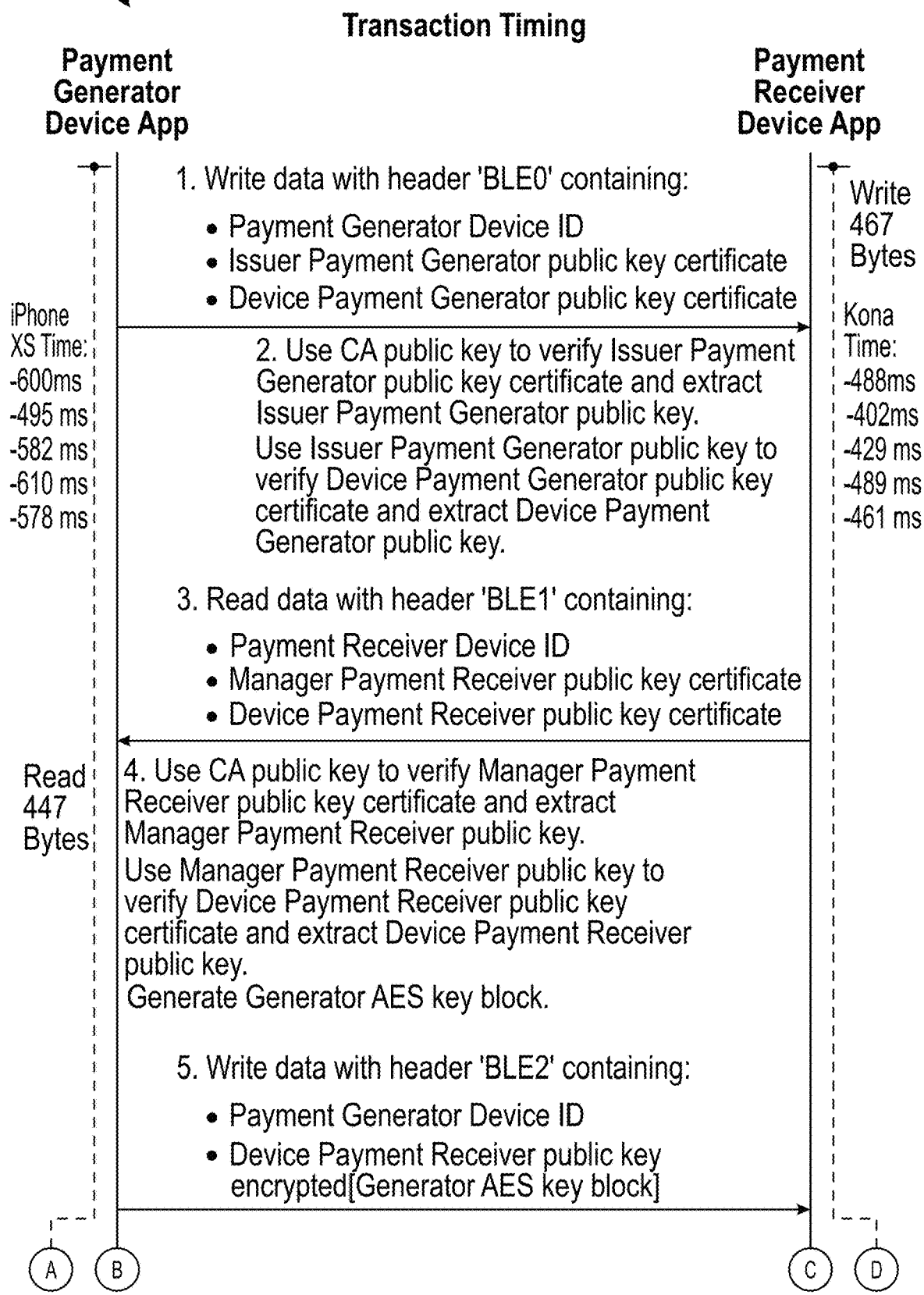
FIG. 15B is an example process flow showing sample timings for steps from FIG. 15A.
Figure 15B:
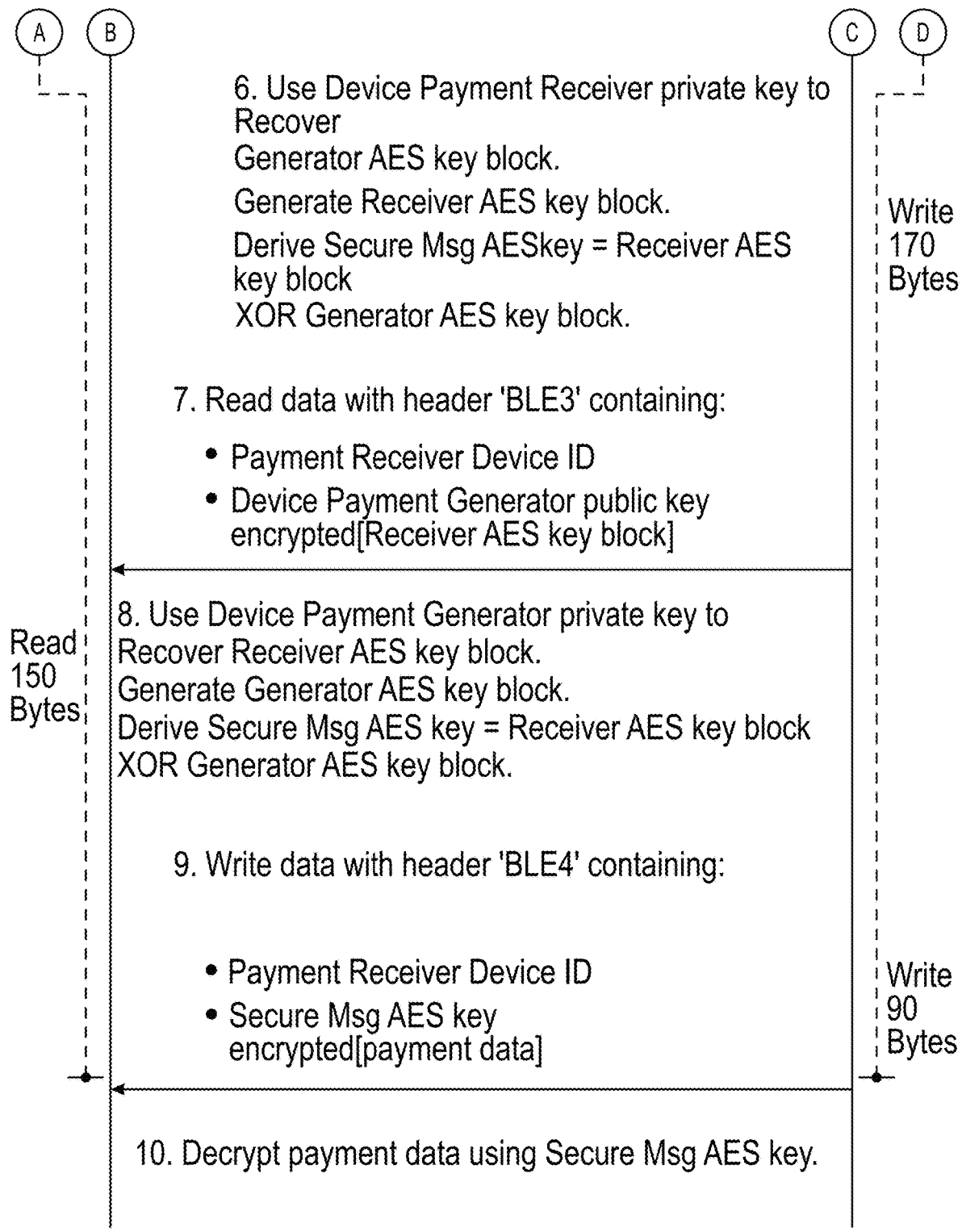

Referring to the step numbering shown in FIG. 15B:

At Step 1, data is written to the payment receiver device with the identifying information of the payment generator device. This message is BLE0.

The written data is a first message containing the payment generator device identifier, the issuer payment generator public key certificate, and the device payment generator public key certificate.

At Step 2, the payment receiver device verifies the issuer payment generator public key and then utilizes the verified issuer payment generator public key to verify the device payment generator public key certificate.

The certificate authority public key is used to verify the issuer payment generator public key certificate, and that is then used to extract the issuer payment generator public key. The issuer payment generator public key is used to verify the device payment generator public key certificate, and to extract the device payment generator public key.

At Step 3, the payment receiver device provides to the payment generator device (in a message noted as BLE1), a set of data elements identifying the identity and validating the identity of the payment receiver device.

The payment generator device reads this information, and the message contains the payment receiver device identifier, the manager payment receiver public key certificate, and the device payment receiver public key certificate.

At Step 4, the payment receiver device can be verified, and a set of encrypted AES key blocks can be generated, and corresponding private keys can be utilized to recover the underlying key blocks.

The payment generator device uses the certificate authority public key to verify the manager payment receiver public key certificate and extracts the manager payment receiver public key. The manager payment receiver public key is then used to verify the device payment receiver public key certificate, and to extract the device payment receiver public key. A generator key block can now be generated.

At step 5, the payment generator device writes a message (denoted for example, as BLE2) to the payment receiver device, which contains the payment generator device identifier, and the generator key block encrypted using the device payment receiver public key.

At Step 6, the payment receiver device receives the message BLE2, and uses the device payment receiver private key to recover the Generator key block (e.g., decrypts it). A receiver key block is generated. A secure message key is derived by conducting an XOR operation between the receiver key block and the generator key block. A message, BLE3, is prepared for transmission to the payment generator device.

At Step 7, the payment generator device receives BLE3, and obtains the payment receiver device identifier, as well as the receiver key block, encrypted using the device payment generator public key.

At Step 8, the payment generator device uses the device payment generator private key to recover the receiver key block, and generates the generator key bloc, and is able to then derive the secure message key based on a XOR operation between the receiver key block and the generator key block.

At Step 9, a message, BLE4, is then provided for transmission to the payment generator device having the payment receiver device identifier, and the payment data encrypted using the secure message key that was derived earlier using the receiver key block and the generator key block.

Accordingly, the payment data is secured using a shared secret key that was generated as part of the mutual authentication process.

At Step 10, BLE4 is received by the payment receiver device, and the payment data is decrypted using the secure message key block that was derived earlier.

When the payment data is decrypted, the payment receiver device can interoperate with a backend process to initiate processing of the transaction. Further steps can include the payment generator device transmitting receipts or other indications that the payment was successful. For example, a receipt could include a transaction number, a transaction confirmation code or message (e.g., message 200 for success, 400 for error). The transaction number may be obtained from the backend transaction processing, etc.

When the customer has successfully completed payment, the mobile application operating as the payment generator device can then render a success screen, such as a green checkmark screen with an itemized receipt shown on it, or a corresponding QR code indicating a successful transaction. The QR code, for example, may be adapted to be scanned by a gate device, and the gate device may coordinate with the backend server to confirm that a transaction having a particular transaction identifier was conducted by a corresponding mobile application having a specific mobile application identifier or customer identifier. When the gate device has confirmed success, the customer may activate a turnstile or a door may open, and the customer leaves with the purchased goods.

In another embodiment, the QR code may be scanned by a human attendant carrying a portable scanning device, and a list of all or some of the items purchased can be shown on a screen for a light visual validation or verification by the human attendant. High value, or sensitive items (e.g., jewelry, pharmaceuticals), can be provided in a different color, or otherwise highlighted for particular attention etc.

FIG. 15B is a message flow diagram 1500B that also shows example timing for messages sent back and forth for establishing the mutual authentication channel, according to some embodiments. The mutual authentication process shows the five (BLE0-BLE5) messages being sent back and forth to securely transmit payment data from the payment generator device to the payment receiver device. While five messages are shown, variations are possible, and more, less, or modified versions of the messages are possible.

The messages are designed to be computationally fast for use on low-speed and/or low capability devices.

As shown in the example timing from an experimental set up, the message flows are adequately fast between a test payment generator device and a payment receiver device such that the channel can be established expeditiously for message exchange.

In FIG. 15B, Bluetooth Low Energy (BLE) messages are utilized to represent the data messages, and these were denoted as BLE0, BLE1, BLE2, BLE3, and BLE4 in the diagram. In this specific example, the payment and acceptance devices authenticate each other) and secure messaging (messages between payment and acceptance devices are encrypted after mutual authentication).

The diagram illustrates is a minimum time BLE connection needs to be established for the transaction to completed between devices and then for the acceptance device to sends transaction request for online approval. iPhone XS is used as the payment device. Kona is the chip used in IoT board as acceptance device.

As shown in the example diagram, the message timing for each of the messaging steps is acceptable on limited hardware (e.g., maximum of 600 ms), which indicates that the transaction was able to be completed in a few seconds, despite the enhanced security measures implemented in the mutual authentication process flow. The total amount of storage space utilized is in the hundreds of bytes, which also indicates that the message flow can operate without requiring a large amount of storage space on the limited capability devices.

The amount of data for each read/write operation is described. Sample data captured from a transaction is provided below:

BLE0 packetData[467]=424c4530333 03631363030432d394533312d343743432d393043462d 45454245453735413 84342457cf81006a7438432dc 37802a70ad0fa57135404c3849f772ef63da998c1db192 319fd af0f041911f221516- 76efa75ddfd29dc1877d0c5de02241d525ed43bb62fea1- 7ed8200d254d8 08523860bf8f456e65b28b75b7- 5815ec8ee8d5bbdc32cefa582fd56dfc7d436f05c00b11d6d2d e9f72d1dfef2e0753904808cc50e6e43a280cbc6dfa18f78 847014a0000f39b8f5c1576f4ab272
17feb5b6808c73ef87e58d782971ede99c7169e446 2e8a5393683df28b7c2021819154cf0246
1aed7e478d0a0dc0e7ea7e0600de608cee09ccde261093 1884b20a707545ff7a6614e39c345
8d97d3fa900e80929dd981eda2cb7f816fa501b6e4c34 4e31b05de49bb64577a0e6822d87c0a39d2e12ace4b0d15d 824baf27f19442dfb64d8563c09c220418d8b0911c31191 9304b42a27
50660e886202b4eac5c3bd2d077deb6311cb19f37 4c6c4c0ecf4601ac940f08afe8535a77ad4
064995980f079b2e31e5784ba7239d809ba803cda6 8b7c4f0dcd0dc368f8ec827047bb78857
953ce78cc7532fce06233fed5ecee4572caf032605e34 10ddd83f0340a935e9d3e4afa2c2ca25ba1282d5d43e01 b41f5936023

BLE1 packetData[447]= 424c4531343335333313630653264653963393937cf866 401ef6a261363b15de34aa9552ed
045217e2eb9ddf1d1835a5abf0d492e992381dd5f6b2 6d9b070f537e1ff1db8565e6832d6e83ec7da572c47c0 3469b6d397a8304d724c26ba4ac3fd708d09d6395fcfa 8d7a5dbfff928ff571f1a83fb5806c6c50efc0b5aef72760 f0b14c1759282937a3749755e4e5970517a2b88105903d04 064ba5d8b7fbfc9c7d61997b74a95fa83302ddda05f35 20e714e34c86a5ba784d7b398b91e8c
d37313b6a51540d0e2b6cc2759df43e40ee79b216b305 8817f055be3437fbf8634277b5840e
47e8c2fe1e491c5b102c24fef42cc3e6bfb553ecd150e 5ee647bffefe03828e6aa8e31c43ffc984
99e544b06d0070a4abf3bc13855f427756740572cf05 b6614e6406aa6e24513043da765fb5
513bebb4f07a92d51125f44be413dc85b107a7a0cf295 11c045e42b39e942204a656a3ceeff2
82fd1651e3f67baf0bf98e74faa561c1bdb043d55088d2- de0c205dd66ae5f6f8e18d73ed7f715c
173d69cc4e753b200af068e492685f6365fb7ecf354de e2777c695fdd9ac9a059aa12ab345b3
50a2b2ddd261c204a0fe3a7f204a28100b93590551d 3a1c5688bbfb BLE2 packetData[170]=424c45 3233303631363030432d394533312d343743432d39304 3462d45454245453735413
84342457c80627fd2d798a1071128d01094022c8e3bd2 d564aefa2fa0a7eca1765e6157fb16d
cecf420c3ec73857f5a7e736c0d4b406a90ac06ae57428f 70d36b503a9b5dddb8ee2e339d8cd
46a479b275adc0e8fdf60cfab7c8a9babe316f127dc9 64b4df0c6780627bc860d8b29895c2d95b11401a6b f205b23380559b38a602c0d368968

BLE3 packetData[150]= 424c4533343335333313630653264653963393937c8 047605cb2666d0d76987c6f979d4ddd
45437c5f278d6a71eedb54dc480bb350f1be1e5e768f77 f577a2bb0a199908202052baa9c988
2903a0033f7a6490ca4e7d819ed562cad9c1f3efa90f41 086f6f48c872c5364cef11f77ddbd3d1
5b42681f1133dd19943ffbf64092c03147d96521a28103 8afe883e28caa0f52c5bd6565b BLE4 packetData[90]=
424c45343330363136303034322d394533312d34374343
2d393043462d45454245453735413
84342457c3041d6c431934dba84f5684e341772b058
2f0237adf473a4c4b2c217691ee8b28a
badb904750e256fdecec637f677bf76b The actual size of data packets is dependent on key sizes. In an example embodiment, the system uses 1948 RSA for CA, 1408 RSA for Payment Issuer/Device Manager, and 1024 RSA for all devices.

As shown above, the timing of the entire flow required about 600 ms, even with the maximum size keys.

Figure 16:
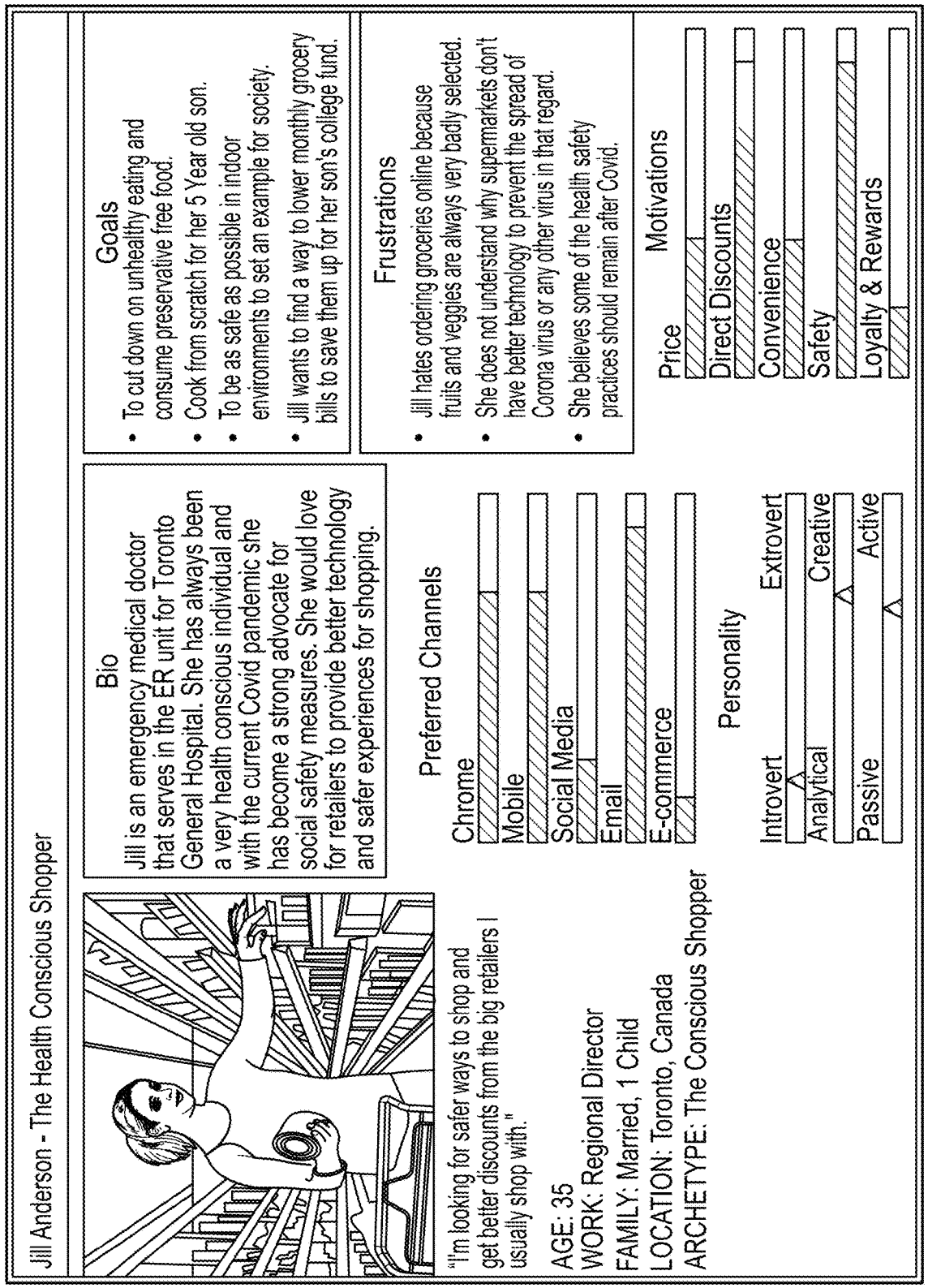
FIG. 16 is an example customer profile for a potential user of the system, according to some embodiments.

FIG. 16 is an example customer profile for a potential customer of the system, according to some embodiments. In this customer profile, the customer is Jill, a health conscious shopper. As described in her profile, she is interested in ways to reduce human-interactions, especially in view of the pandemic climate.

She is frustrated with the shopping experience and would appreciate technology whereby she is able to check out in a more seamless manner. The system as described in some embodiments can be used by Jill through her mobile device operating, for example, using a low-energy communications protocol to communicate in a secure manner with a distributed IoT device (that can be placed at strategic locations, or consolidated into a payment zone) that acts as a pseudo-mobile checkout terminal that she can interact with.

Steps as described above, etc., can be utilized for ensuring that secure communication channels are utilized to ensure that there is mutual authentication and exchange of certificates. The mutual authentication process needs to be robust, yet computationally "fast" enough to avoid inconveniencing Jill, so there are technical constraints imposed on the solution.

Figure 17:
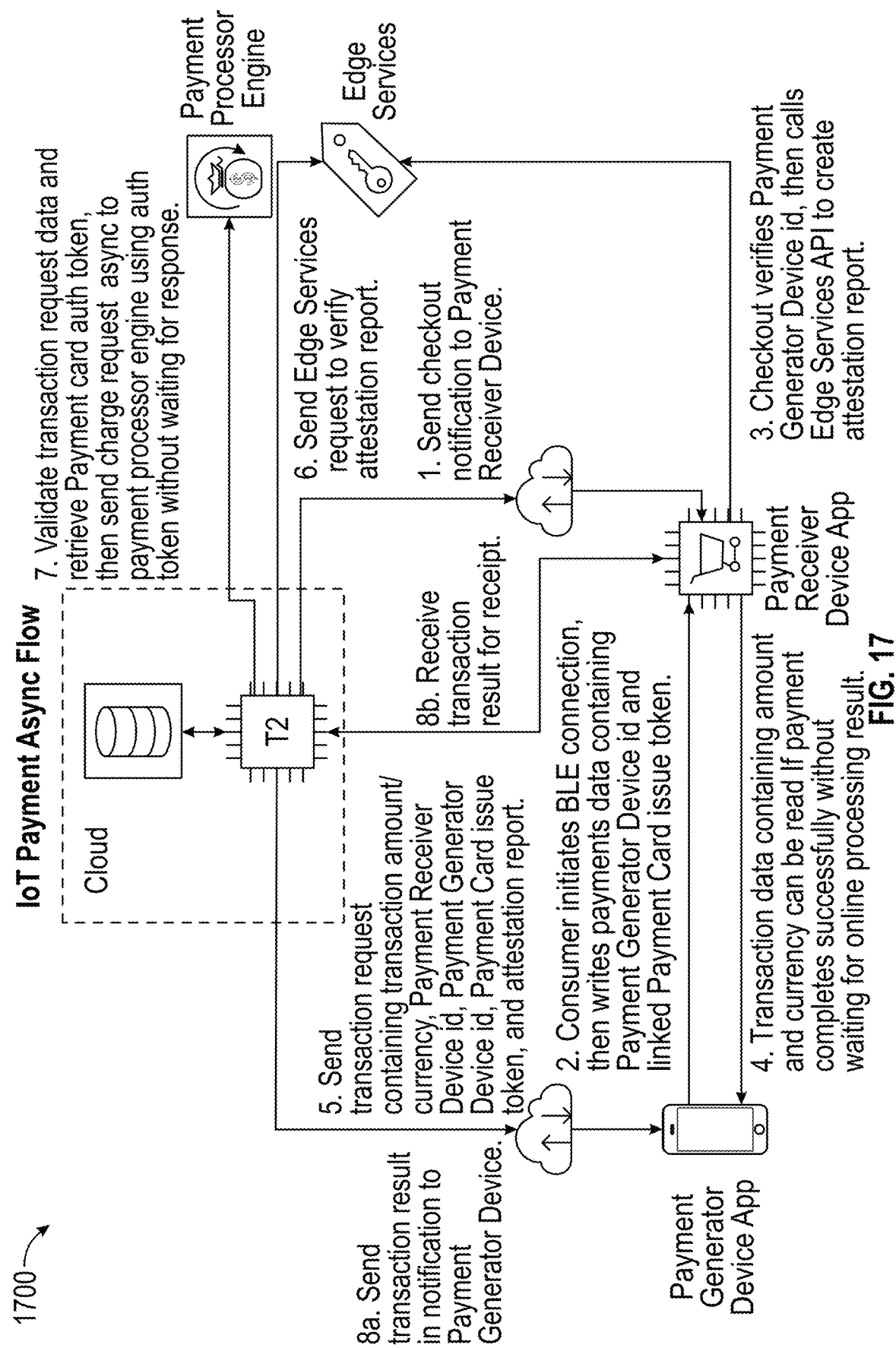
FIG. 17 is an example method for an asynchronous payment, according to some embodiments.

FIG. 17 is an example method 1700 for an asynchronous payment, according to some embodiments. In this example, a number of steps are shown whereby the transaction data can be conducted without waiting for an online processing result. This is particularly useful in situations where there is either no online connection, the connection is not operating temporarily, or where there is a backlog in processing.

Figure 18:
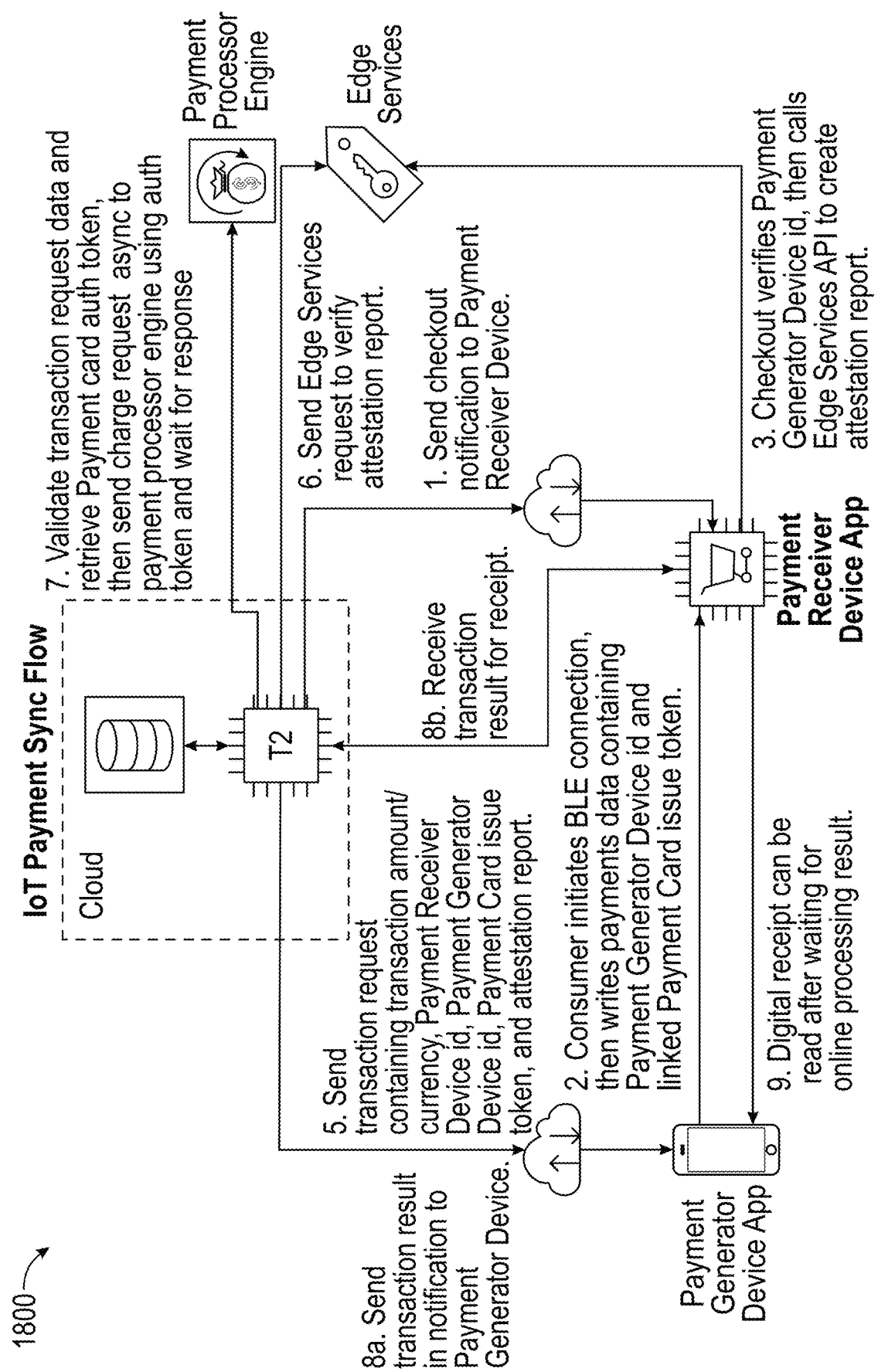
FIG. 18 is an example method for a synchronous payment, according to some embodiments.

FIG. 18 is an example method 1800 for a synchronous payment, according to some embodiments. In this example, the synchronous payment requires a waiting for an online processing result. This approach improves security at the cost of processing speed, especially if there is a backend processing backlog or constrained resources. In some embodiments, the approach can include toggling between synchronous and asynchronous flows based on detected network conditions, system load, or connection availability. In some embodiments, certain IoT devices operate in a synchronous mode, while others can operate in an asynchronous mode. For example, IoT devices that reside within a basement of a shopping center may not have available connections to obtain online processing results.

Figure 19:
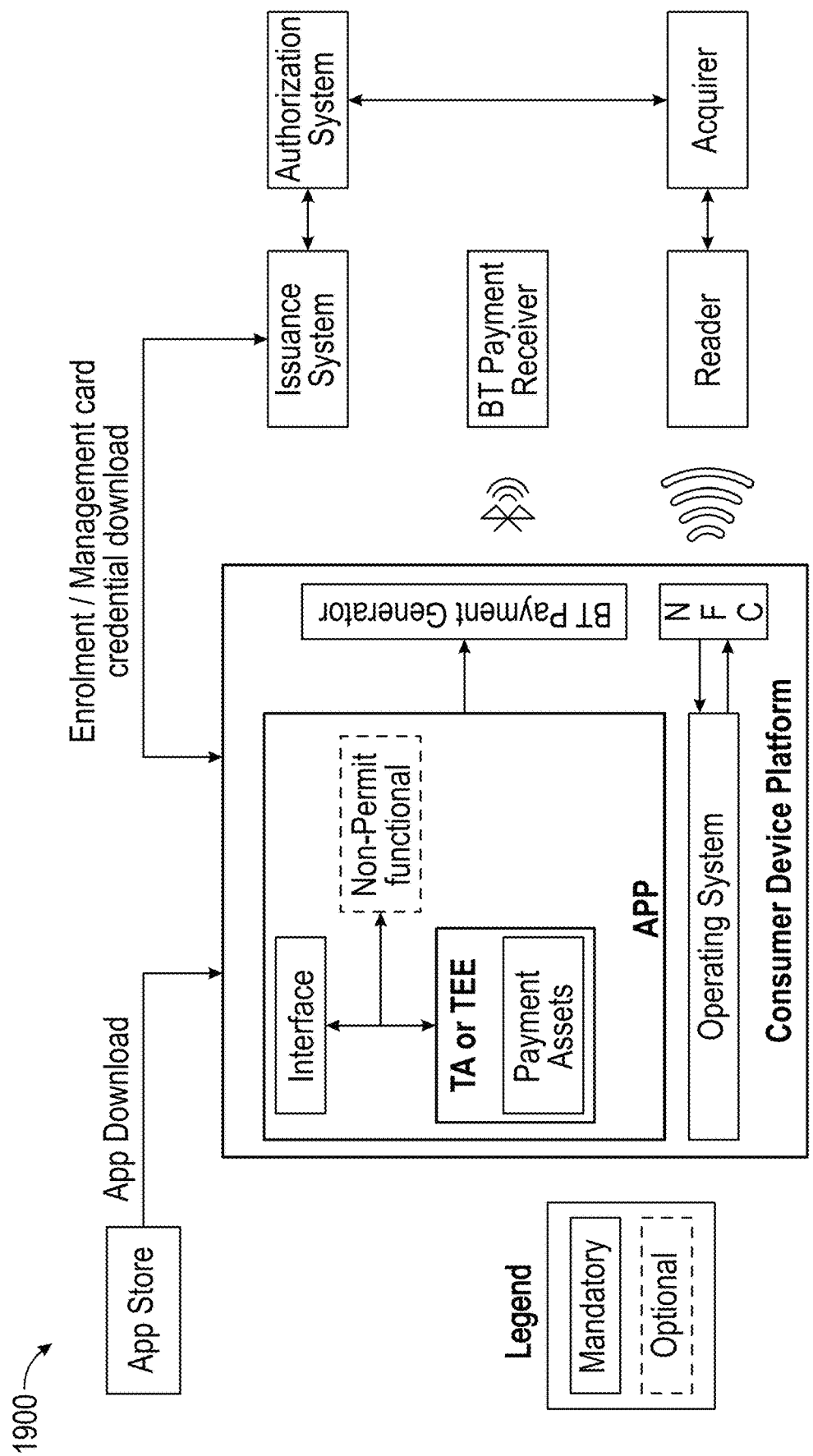
FIG. 19 is an example block schematic diagram showing an example computational device for near range communications, according to some embodiments.

FIG. 19 is an example block schematic diagram 1900 showing an example computational device for near range communications, according to some embodiments. As shown here, there are a number of systems that interoperate with one another using communication mechanisms such as Bluetooth, near field communications, among others.

Figure 20:
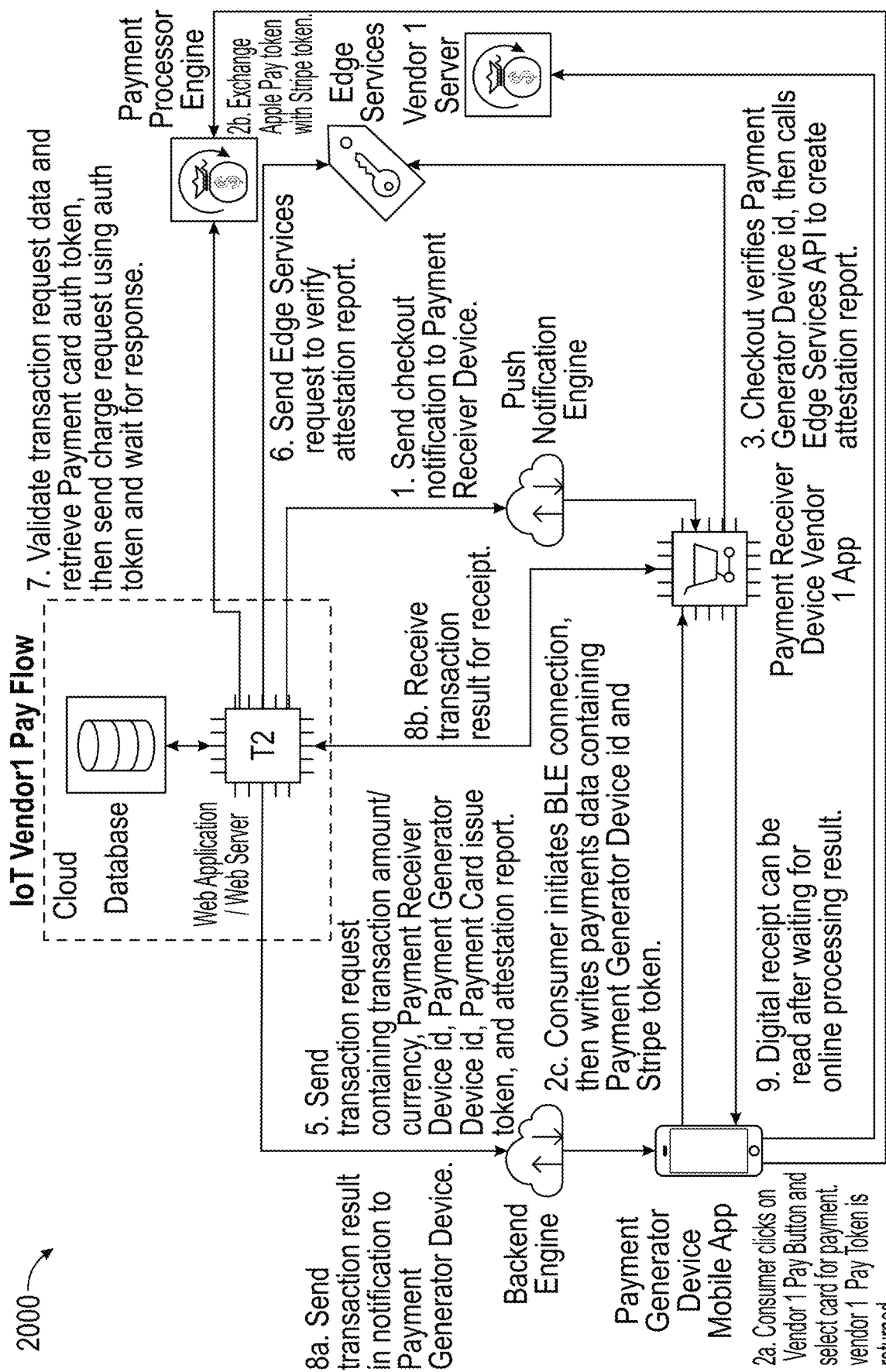
FIG. 20 is an example method for a payment using a first vendor's computational platform, according to some embodiments.

FIG. 20 is an example method 2000 for a payment using a first vendor's computational platform, according to some embodiments.

Figure 21:
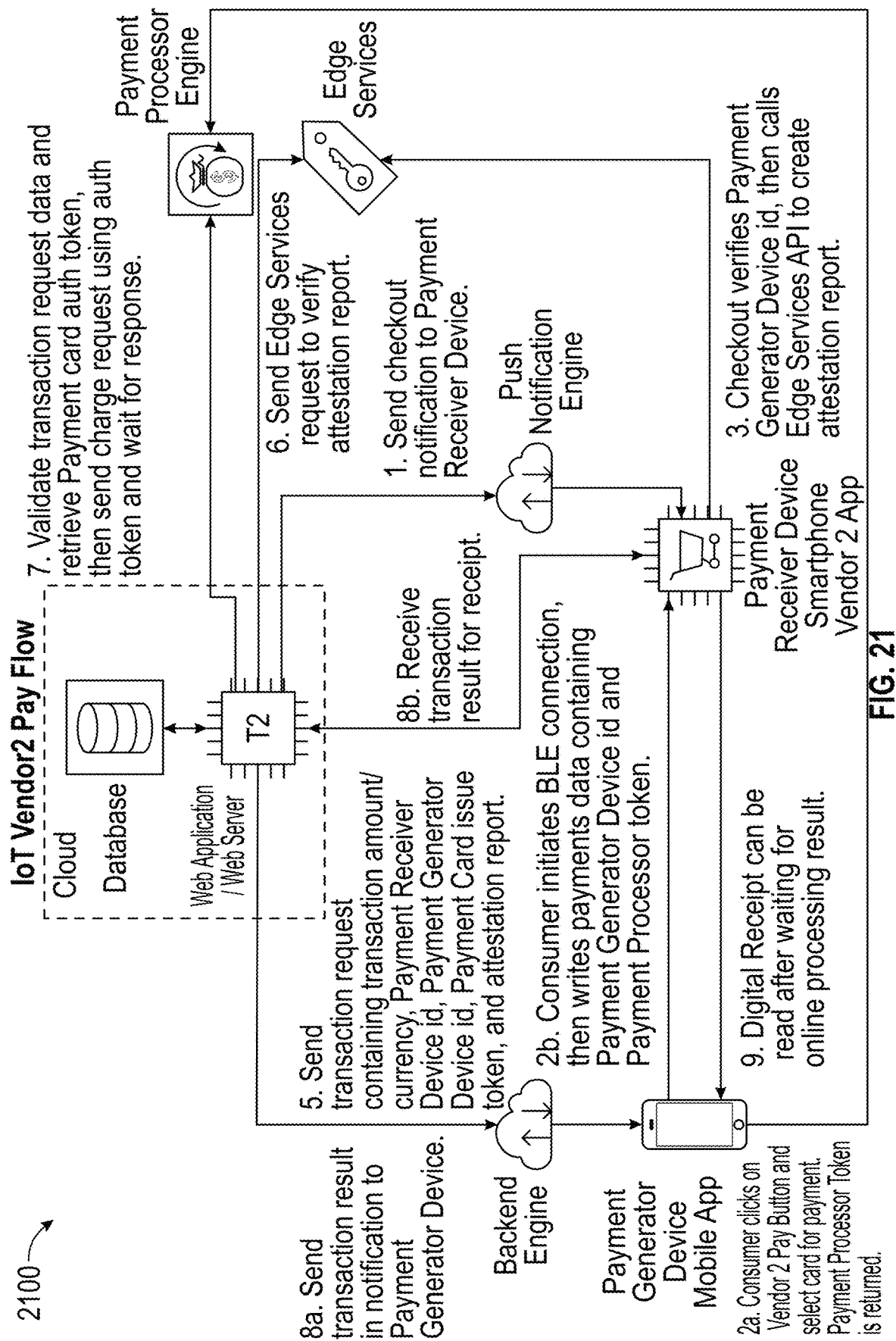
FIG. 21 is an example method for a payment using a second vendor's computational platform, according to some embodiments.

FIG. 21 is an example method 2100 for a payment using a second vendor's computational platform, according to some embodiments.

These two flows show two different practical approaches that can be used in the context of differing technology platforms and stacks.

Figure 22:
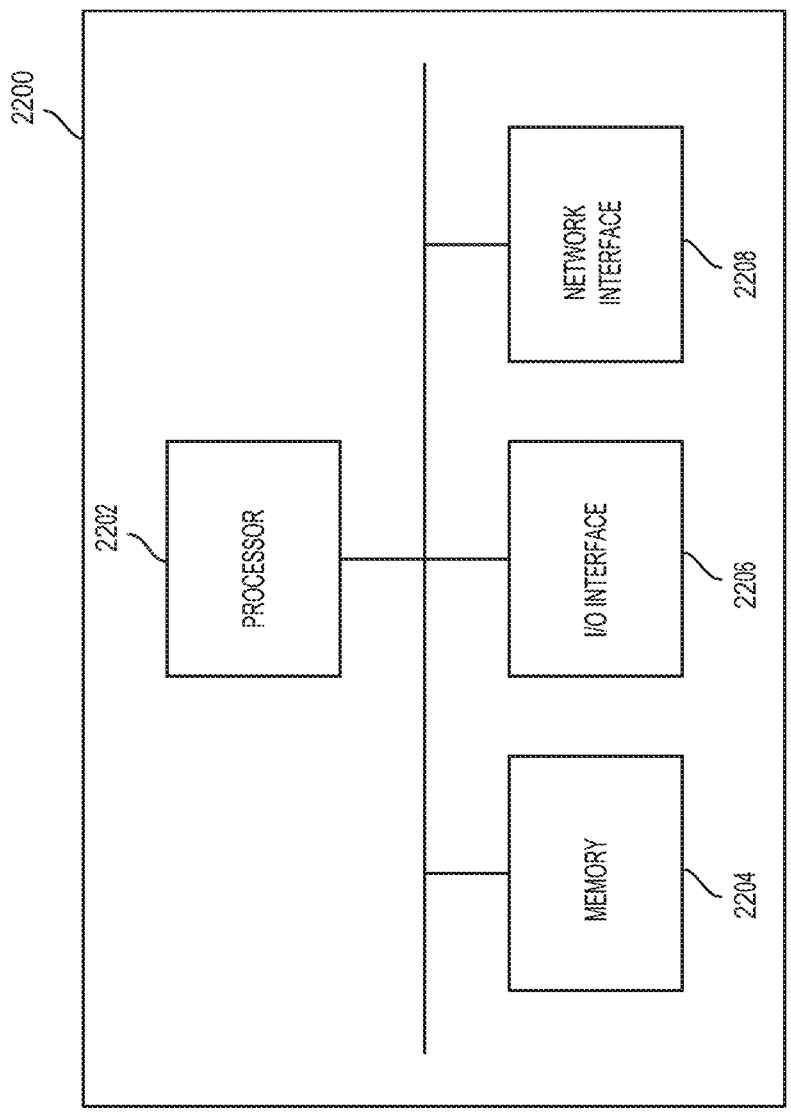
FIG. 22 is a schematic diagram of a computing device such as a computer server for providing a gateway for IoT communications.

FIG. 22 is a schematic diagram of a computing device 2200 such as a computer server for providing a gateway for IoT communications. As depicted, the computing device includes at least one processor 2202, memory 2204, at least one I/O interface 2206, and at least one network interface 2208.

Processor 2202 may be an Intel or AMD x86 or x64, PowerPC, ARM processor, or the like. Memory 2204 may include a suitable combination of computer memory that is located either internally or externally such as, for example, random-access memory (RAM), read-only memory (ROM), compact disc read-only memory (CDROM).

Each I/O interface 2206 enables computing device 2200 to interconnect with one or more input devices, such as a keyboard, mouse, camera, touch screen and a microphone, or with one or more output devices such as a display screen and a speaker.

Each network interface 2208 enables computing device 2200 to communicate with other components, for example, through API 118 to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A data communications gateway for secure communications of data packets between a broadcast checkout terminal device and a customer smart phone device that have not been mutually verified, the data communications gateway comprising:
a processor operating in conjunction with computer memory and data storage, the processor configured to:
register the broadcast checkout terminal device to obtain a device payment receiver public key certificate from one or more certificate authorities using one or more encryption keys stored on a trusted execution environment present on the broadcast checkout terminal device, wherein the broadcast checkout terminal device is capable of connections through proximity communications within broadcasting range of a communication interface of the broadcast checkout terminal device;
register the customer smart phone device to obtain a device payment generator public key certificate from one or more certificate authorities, the customer smart phone device being within broadcasting range of the communication interface of the broadcast checkout terminal device;
generate a certificate authority public key for the customer smart phone device, an issuer payment generator public key certificate, a device payment generator private key, and a device payment generator public key for storage with the device payment generator public key certificate in the customer smart phone device;
generate a certificate authority public key for the broadcast checkout terminal device, a manager payment receiver public key certificate, a device payment receiver private key, and a device payment receiver public key for storage with the device payment receiver public key certificate in the broadcast checkout terminal device;
receive, from the customer smart phone device, a data packet representing a request for payment;
verify certificates present in a series of messages transmitted between the broadcast checkout terminal device and the customer smart phone device to mutually authenticate the devices and verify that the series of messages are signed by the devices, wherein the series of messages comprises:
a first message transmitted from the customer smart phone device to the broadcast checkout terminal device, the first message including the issuer payment generator public key certificate and the device payment generator public key certificate, wherein the broadcast checkout terminal device is configured for using the certificate authority public key to verify the issuer payment generator public key certificate, using the issuer payment generator public key to verify the device payment generator public key certificate, and extracting the device payment generator public key;
a second message transmitted from the broadcast checkout terminal device to the customer smart phone device, the second message including the manager payment receiver device public certificate, and the device payment receiver public key certificate, wherein the customer smart phone device is configured for using the certificate authority public key to verify the manager payment receiver public key certificate and extract the manager payment receiver public key, and using the manager payment receiver public key to verify the device payment receiver public key certificate and extract the device payment receiver public key, and generating a generator key block;
a third message transmitted from the customer smart phone device to the broadcast checkout terminal device, the third message including the generator key block encrypted using the device payment receiver public key, wherein the broadcast checkout terminal device is configured for using the device payment receiver private key to recover the generator key block, generating a receiver key block, and deriving a shared key block using a combination of the receiver key block and the generator key block;
a fourth message transmitted from the broadcast checkout terminal device to the customer smart phone device, the fourth message including the receiver key block encrypted using the device payment generator public key, wherein the customer smart phone device is configured for using the device payment generator private key to recover the receiver key block, and deriving the shared key block using the combination of the receiver key block and the generator key block; and
a fifth message transmitted from the customer smart phone device to the broadcast checkout terminal device including payment data from the data packet encrypted using the shared key block; and
process a payment transaction based at least on the payment data from the data packet.

2. The data communications gateway of claim 1, wherein the one or more encryption keys are utilized to attest one or more properties of the trusted execution environment to validate the identity of the broadcast checkout terminal device.

3. The data communications gateway of claim 2, wherein the data packet includes an attestation report, generated by an edge service server, based on the one or more encryption keys being utilized to attest the one or more properties of the trusted execution environment.

4. The data communications gateway of claim 1, wherein the broadcast checkout terminal device connects to an external hub with a trusted execution environment to store the one or more encryption keys.

5. The data communications gateway of claim 1, wherein a shared secure channel is established between the broadcast checkout terminal device and the customer smart phone device using a shared secret certificate generated from nonces, the device payment generator public key certificate and the device payment receiver public key certificate, the nonces generated by the broadcast checkout terminal device and the customer smart phone device.

6. The data communications gateway of claim 1, wherein the processor further transmits one or more receipts from the broadcast checkout terminal device to the customer smart phone device to indicate completion of the payment transaction.

7. The data communications gateway of claim 6, wherein the processor further renders a specific graphical user interface on the customer smart phone device to indicate completion of the payment transaction.

8. The data communications gateway of claim 7, wherein the specific graphical user interface is a two-dimensional matrix barcode adapted to be scanned by a gate device.

9. The data communications gateway of claim 8, wherein the two-dimensional matrix barcode may be scanned by a portable scanning device to render details of the payment transaction on the user interface of the customer smart phone device for verification.

10. The data communications gateway of claim 1, wherein the series of messages are transmitted using low energy proximity beacon signals.

11. A data communications method for secure communications of data packets between a broadcast checkout terminal device and a customer smart phone device that have not been mutually verified, the data communications method comprising:
  registering the broadcast checkout terminal device to obtain a device payment receiver public key certificate from one or more certificate authorities using one or more encryption keys stored on a trusted execution environment present on the broadcast checkout terminal device, wherein the broadcast checkout terminal device is capable of connections through proximity communications within broadcasting range of a communication interface of the broadcast checkout terminal device;
  registering the customer smart phone device to obtain a device payment generator public key certificate from one or more certificate authorities, the customer smart phone device being within broadcasting range of the communication interface of the broadcast checkout terminal device;
  generating a certificate authority public key for the customer smart phone device, an issuer payment generator public key certificate, a device payment generator private key, and a device payment generator public key for storage with the device payment generator public key certificate in the customer smart phone device;
  generating a certificate authority public key for the broadcast checkout terminal device, a manager payment receiver public key certificate, a device payment receiver private key, and a device payment receiver public key for storage with the device payment receiver public key certificate in the broadcast checkout terminal device;
  receiving, from the customer smart phone device, a data packet representing a request for payment;
  verifying certificates present in a series of messages transmitted between the broadcast checkout terminal device and the customer smart phone device to mutually authenticate the devices and verify that the series of messages are signed by the devices, wherein the series of messages comprises:
    a first message transmitted from the customer smart phone device to the broadcast checkout terminal device, the first message including the issuer payment generator public key certificate and the device payment generator public key certificate, wherein the broadcast checkout terminal device is configured for using the certificate authority public key to verify the issuer payment generator public key certificate, using the issuer payment generator public key to verify the device payment generator public key certificate, and extracting the device payment generator public key;
    a second message transmitted from the broadcast checkout terminal device to the customer smart phone device, the second message including the manager payment receiver device public certificate, and the device payment receiver public key certificate, wherein the customer smart phone device is configured for using the certificate authority public key to verify the manager payment receiver public key certificate and extract the manager payment receiver public key, and using the manager payment receiver public key to verify the device payment receiver public key certificate and extract the device payment receiver public key, and generating a generator key block;
    a third message transmitted from the customer smart phone device to the broadcast checkout terminal device, the third message including the generator key block encrypted using the device payment receiver public key, wherein the broadcast checkout terminal device is configured for using the device payment receiver private key to recover the generator key block, generating a receiver key block, and deriving a shared key block using a combination of the receiver key block and the generator key block;
    a fourth message transmitted from the broadcast checkout terminal device to the customer smart phone device, the fourth message including the receiver key block encrypted using the device payment generator public key, wherein the customer smart phone device is configured for using the device payment generator private key to recover the receiver key block, and deriving the shared key block using the combination of the receiver key block and the generator key block; and
    a fifth message transmitted from the customer smart phone device to the broadcast checkout terminal device including payment data from the data packet encrypted using the shared key block; and
  processing a payment transaction based at least on the payment data from the data packet.

12. The data communications method of claim 11, wherein the one or more encryption keys are utilized to attest one or more properties of the trusted execution environment to validate the identity of the broadcast checkout terminal device.

13. The data communications method of claim 12, wherein the data packet includes an attestation report, generated by an edge service server, based on the one or more encryption keys being utilized to attest the one or more properties of the trusted execution environment.

14. The data communications method of claim 11, wherein the broadcast checkout terminal device connects to an external hub with a trusted execution environment to store the one or more encryption keys.

15. The data communications method of claim 11, wherein a shared secure channel is established between the broadcast checkout terminal device and the customer smart phone device using a shared secret certificate generated from nonces, the device payment generator public key certificate and the device payment receiver public key certificate, the nonces generated by the broadcast checkout terminal device and the customer smart phone device.

16. The data communications method of claim 11, wherein the method further comprises transmitting one or more receipts from the broadcast checkout terminal device to the customer smart phone device to indicate completion of the payment transaction.

17. The data communications method of claim 16, wherein the method further comprises rendering a specific graphical user interface on the customer smart phone device to indicate completion of the payment transaction.

18. The data communications method of claim 17, wherein the specific graphical user interface is a two-dimensional matrix barcode adapted to be scanned by a gate device.

19. The data communications method of claim 18, wherein the two-dimensional matrix barcode may be scanned by a portable scanning device to render details of the payment transaction on the user interface of the customer smart phone device for verification.

20. A non-transitory computer readable medium storing machine interpretable instructions, which when executed by a processor, cause the processor to perform a method for secure communications of data packets between a broadcast checkout terminal device and a customer smart phone device that have not been mutually verified, the method comprising:

registering the broadcast checkout terminal device to obtain a device payment receiver public key certificate from one or more certificate authorities using one or more encryption keys stored on a trusted execution environment present on the broadcast checkout terminal device, wherein the broadcast checkout terminal device is capable of connections through proximity communications within broadcasting range of a communication interface of the broadcast checkout terminal device;

registering the customer smart phone device to obtain a device payment generator public key certificate from one or more certificate authorities, the customer smart phone device being within broadcasting range of the communication interface of the broadcast checkout terminal device;

generating a certificate authority public key for the customer smart phone device, an issuer payment generator public key certificate, a device payment generator private key, and a device payment generator public key for storage with the device payment generator public key certificate in the customer smart phone device;

generating a certificate authority public key for the broadcast checkout terminal device, a manager payment receiver public key certificate, a device payment receiver private key, and a device payment receiver public key for storage with the device payment receiver public key certificate in the broadcast checkout terminal device;

receiving, from the customer smart phone device, a data packet representing a request for payment;

verifying certificates present in a series of messages transmitted between the broadcast checkout terminal device and the customer smart phone device to mutually authenticate the devices and verify that the series of messages are signed by the devices, wherein the series of messages comprises:

a first message transmitted from the customer smart phone device to the broadcast checkout terminal device, the first message including the issuer payment generator public key certificate and the device payment generator public key certificate, wherein the broadcast checkout terminal device is configured for using the certificate authority public key to verify the issuer payment generator public key certificate, using the issuer payment generator public key to verify the device payment generator public key certificate, and extracting the device payment generator public key;

a second message transmitted from the broadcast checkout terminal device to the customer smart phone device, the second message including the manager payment receiver device public certificate, and the device payment receiver public key certificate, wherein the customer smart phone device is configured for using the certificate authority public key to verify the manager payment receiver public key certificate and extract the manager payment receiver public key, and using the manager payment receiver public key to verify the device payment receiver public key certificate and extract the device payment receiver public key, and generating a generator key block;

a third message transmitted from the customer smart phone device to the broadcast checkout terminal device, the third message including the generator key block encrypted using the device payment receiver public key, wherein the broadcast checkout terminal device is configured for using the device payment receiver private key to recover the generator key block, generating a receiver key block, and deriving a shared key block using a combination of the receiver key block and the generator key block;

a fourth message transmitted from the broadcast checkout terminal device to the customer smart phone device, the fourth message including the receiver key block encrypted using the device payment generator public key, wherein the customer smart phone device is configured for using the device payment generator private key to recover the receiver key block, and deriving the shared key block using the combination of the receiver key block and the generator key block; and a fifth message transmitted from the customer smart phone device to the broadcast checkout terminal device including payment data from the data packet encrypted using the shared key block; and processing a payment transaction based at least on the payment data from the data packet.

* * * * *